US010955546B2

(12) United States Patent
 Fox

(10) Patent No.: US 10,955,546 B2
(45) Date of Patent: Mar. 23, 2021

(54) SYNTHETIC APERTURE RADAR IMAGING APPARATUS AND METHODS

(71) Applicant: URTHECAST CORP., Vancouver (CA)

(72) Inventor: Peter Allen Fox, Burnaby (CA)

(73) Assignee: Urthecast Corp., Vancouver (CA)

( * ) Notice: Subject to any disclaimer, the term of this patent is extended or adjusted under 35 U.S.C. 154(b) by 281 days.

(21) Appl. No.: 15/778,188

(22) PCT Filed: Nov. 23, 2016

(86) PCT No.: PCT/US2016/063630
§ 371 (c)(1),
(2) Date: May 22, 2018

(87) PCT Pub. No.: WO2017/091747
PCT Pub. Date: Jun. 1, 2017

(65) Prior Publication Data
US 2018/0356516 A1 Dec. 13, 2018

Related U.S. Application Data

(60) Provisional application No. 62/260,063, filed on Nov. 25, 2015.

(51) Int. Cl.
*G01S 13/90* (2006.01)
*G01S 7/00* (2006.01)
*G01S 13/76* (2006.01)

(52) U.S. Cl.
CPC .............. *G01S 13/90* (2013.01); *G01S 7/003* (2013.01); *G01S 7/006* (2013.01); *G01S 13/765* (2013.01)

(58) Field of Classification Search
None
See application file for complete search history.

(56) References Cited

U.S. PATENT DOCUMENTS 3,193,830 A 7/1965 Provencher
3,241,140 A 3/1966 Raabe
(Continued)

FOREIGN PATENT DOCUMENTS

CA 2 428 513 C 2/2008
CA 2 488 909 C 7/2010
(Continued)

OTHER PUBLICATIONS

Bordoni et al., "Ambiguity Suppression by Azimuth Phase Coding in Multichannel SAR Systems," *International Geoscience and Remote Sensing Symposium*, Vancouver, Canada, Jul. 24-29, 2011, 16 pages.
(Continued)

*Primary Examiner* — Whitney Moore
(74) *Attorney, Agent, or Firm* — Seed Intellectual Property Law Group LLP

(57) ABSTRACT

A synthetic aperture radar (SAR) is operable in an interrogation mode and in a self-imaging mode, the self-imaging mode entered in response to determining a response to interrogation pulses have been received from a ground terminal and position information specifying a ground location has been received from the ground terminal. A ground terminal is operable to receive interrogation pulses transmitted by a SAR, transmit responses, and transmit position information to cause the SAR to enter a self-imaging mode. The ground terminal receives first and subsequent pulses from the SAR where subsequent pulses include backscatter and are encoded. The ground terminal generates a range line by range compression.

22 Claims, 14 Drawing Sheets

(56) References Cited

U.S. PATENT DOCUMENTS

| | | | |
|---|---|---|---|
| 3,460,139 A | 8/1969 | Rittenbach | |
| 3,601,529 A | 8/1971 | Dischert | |
| 3,715,962 A | 2/1973 | Yost, Jr. | |
| 3,808,357 A | 4/1974 | Nakagaki et al. | |
| 4,163,247 A | 7/1979 | Bock et al. | |
| 4,214,264 A | 7/1980 | Hayward et al. | |
| 4,246,598 A | 1/1981 | Bock et al. | |
| 4,404,586 A | 9/1983 | Tabei | |
| 4,514,755 A | 4/1985 | Tabei | |
| 4,656,508 A | 4/1987 | Yokota | |
| 4,803,645 A | 2/1989 | Ohtomo et al. | |
| 4,823,186 A | 4/1989 | Muramatsu | |
| 4,924,229 A | 5/1990 | Eichel et al. | |
| 4,951,136 A | 8/1990 | Drescher et al. | |
| 5,057,843 A | 10/1991 | Dubois et al. | |
| 5,059,966 A | 10/1991 | Fujisaka et al. | |
| 5,093,663 A | 3/1992 | Baechtiger et al. | |
| 5,173,949 A | 12/1992 | Peregrim et al. | |
| 5,248,979 A | 9/1993 | Orme et al. | |
| 5,313,210 A | 5/1994 | Gail | |
| 5,486,830 A | 1/1996 | Axline, Jr. et al. | |
| 5,489,907 A | 2/1996 | Zink et al. | |
| 5,512,899 A | 4/1996 | Osawa et al. | |
| 5,546,091 A | 8/1996 | Haugen et al. | |
| 5,552,787 A | 9/1996 | Schuler et al. | |
| 5,646,623 A | 7/1997 | Walters et al. | |
| 5,745,069 A | 4/1998 | Gail | |
| 5,760,899 A | 6/1998 | Eismann | |
| 5,790,188 A | 8/1998 | Sun | |
| 5,821,895 A | 10/1998 | Hounam et al. | |
| 5,883,584 A | 3/1999 | Langemann et al. | |
| 5,926,125 A | 7/1999 | Wood | |
| 5,945,940 A | 8/1999 | Cuomo | |
| 5,949,914 A | 9/1999 | Yuen | |
| 5,952,971 A | 9/1999 | Strickland | |
| 5,973,634 A | 10/1999 | Kare | |
| 6,007,027 A | 12/1999 | Diekelman et al. | |
| 6,122,404 A | 9/2000 | Barter et al. | |
| 6,241,192 B1 | 6/2001 | Kondo et al. | |
| 6,259,396 B1 | 7/2001 | Pham et al. | |
| 6,347,762 B1 | 2/2002 | Sims et al. | |
| 6,359,584 B1 | 3/2002 | Cordey et al. | |
| 6,502,790 B1 | 1/2003 | Murphy | |
| 6,573,856 B1 | 6/2003 | Obenshain | |
| 6,577,266 B1 | 6/2003 | Axline | |
| 6,614,813 B1 | 9/2003 | Dudley et al. | |
| 6,633,253 B2 | 10/2003 | Cataldo | |
| 6,653,970 B1 * | 11/2003 | Mitra | G01S 13/003 342/22 |
| 6,678,048 B1 | 1/2004 | Rienstra et al. | |
| 6,741,250 B1 | 5/2004 | Furlan et al. | |
| 6,781,540 B1 | 8/2004 | MacKey et al. | |
| 6,781,707 B2 | 8/2004 | Peters et al. | |
| 6,831,688 B2 | 12/2004 | Lareau et al. | |
| 6,864,827 B1 | 3/2005 | Tise et al. | |
| 6,914,553 B1 | 7/2005 | Beadle et al. | |
| 6,919,839 B1 | 7/2005 | Beadle et al. | |
| 6,970,142 B1 | 11/2005 | Pleva et al. | |
| 7,015,855 B1 | 3/2006 | Medl et al. | |
| 7,019,777 B2 | 3/2006 | Sun | |
| 7,034,746 B1 | 4/2006 | McMakin et al. | |
| 7,064,702 B1 | 6/2006 | Abatzoglou | |
| 7,095,359 B2 | 8/2006 | Matsuoka et al. | |
| 7,123,169 B2 | 10/2006 | Farmer et al. | |
| 7,149,366 B1 | 12/2006 | Sun | |
| 7,158,878 B2 | 1/2007 | Rasmussen et al. | |
| 7,167,280 B2 | 1/2007 | Bogdanowicz et al. | |
| 7,212,149 B2 | 5/2007 | Abatzoglou et al. | |
| 7,218,268 B2 | 5/2007 | VandenBerg | |
| 7,242,342 B2 | 7/2007 | Wu et al. | |
| 7,270,299 B1 | 9/2007 | Murphy | |
| 7,292,723 B2 | 11/2007 | Tedesco et al. | |
| 7,298,922 B1 | 11/2007 | Lindgren et al. | |
| 7,327,305 B2 | 2/2008 | Loehner et al. | |
| 7,348,917 B2 | 3/2008 | Stankwitz et al. | |
| 7,379,612 B2 | 5/2008 | Milanfar et al. | |
| 7,385,705 B1 | 6/2008 | Hoctor et al. | |
| 7,412,107 B2 | 8/2008 | Milanfar et al. | |
| 7,414,706 B2 | 8/2008 | Nichols et al. | |
| 7,417,210 B2 | 8/2008 | Ax, Jr. et al. | |
| 7,423,577 B1 | 9/2008 | McIntire et al. | |
| 7,468,504 B2 | 12/2008 | Halvis et al. | |
| 7,475,054 B2 | 1/2009 | Hearing et al. | |
| 7,477,802 B2 | 1/2009 | Milanfar et al. | |
| 7,486,221 B2 | 2/2009 | Meyers et al. | |
| 7,536,365 B2 | 5/2009 | Aboutalib | |
| 7,545,309 B1 | 6/2009 | McIntire et al. | |
| 7,548,185 B2 | 6/2009 | Sheen et al. | |
| 7,570,202 B2 | 8/2009 | Raney | |
| 7,599,790 B2 | 10/2009 | Rasmussen et al. | |
| 7,602,997 B2 | 10/2009 | Young | |
| 7,623,064 B2 | 11/2009 | Calderbank et al. | |
| 7,646,326 B2 | 1/2010 | Antonik et al. | |
| 7,698,668 B2 | 4/2010 | Balasubramanian et al. | |
| 7,705,766 B2 | 4/2010 | Lancashire et al. | |
| 7,733,961 B2 | 6/2010 | O'Hara et al. | |
| 7,746,267 B2 | 6/2010 | Raney | |
| 7,769,229 B2 | 8/2010 | O'Brien et al. | |
| 7,769,241 B2 | 8/2010 | Adams, Jr. et al. | |
| 7,781,716 B2 | 8/2010 | Anderson et al. | |
| 7,825,847 B2 | 11/2010 | Fujimura | |
| 7,830,430 B2 | 11/2010 | Adams, Jr. et al. | |
| 7,844,127 B2 | 11/2010 | Adams, Jr. et al. | |
| 7,855,740 B2 | 12/2010 | Hamilton, Jr. et al. | |
| 7,855,752 B2 | 12/2010 | Baker et al. | |
| 7,876,257 B2 | 1/2011 | Vetro et al. | |
| 7,884,752 B2 | 2/2011 | Hellsten et al. | |
| 7,897,902 B2 | 3/2011 | Katzir et al. | |
| 7,911,372 B2 | 3/2011 | Nelson | |
| 7,924,210 B2 | 4/2011 | Johnson | |
| 7,936,949 B2 | 5/2011 | Riley et al. | |
| 7,940,282 B2 | 5/2011 | Milanfar et al. | |
| 7,940,959 B2 | 5/2011 | Rubenstein | |
| 7,944,390 B2 | 5/2011 | Krieger et al. | |
| 7,991,226 B2 | 8/2011 | Schultz et al. | |
| 8,013,778 B2 | 9/2011 | Grafmueller et al. | |
| 8,031,258 B2 | 10/2011 | Enge et al. | |
| 8,040,273 B2 | 10/2011 | Tomich et al. | |
| 8,045,024 B2 | 10/2011 | Kumar et al. | |
| 8,049,657 B2 | 11/2011 | Prats et al. | |
| 8,053,720 B2 | 11/2011 | Han et al. | |
| 8,059,023 B2 | 11/2011 | Richard | |
| 8,068,153 B2 | 11/2011 | Kumar et al. | |
| 8,073,246 B2 | 12/2011 | Adams, Jr. et al. | |
| 8,078,009 B2 | 12/2011 | Riley et al. | |
| 8,090,312 B2 | 1/2012 | Robinson | |
| 8,094,960 B2 | 1/2012 | Riley et al. | |
| 8,111,307 B2 | 2/2012 | Deever et al. | |
| 8,115,666 B2 | 2/2012 | Moussally et al. | |
| 8,116,576 B2 | 2/2012 | Kondo | |
| 8,125,370 B1 | 2/2012 | Rogers et al. | |
| 8,125,546 B2 | 2/2012 | Adams, Jr. et al. | |
| 8,134,490 B2 | 3/2012 | Gebert et al. | |
| 8,138,961 B2 | 3/2012 | Deshpande | |
| 8,169,358 B1 | 5/2012 | Bourdelais et al. | |
| 8,169,362 B2 | 5/2012 | Cook et al. | |
| 8,179,445 B2 | 5/2012 | Hao | |
| 8,180,851 B1 | 5/2012 | CaveLie | |
| 8,194,296 B2 | 6/2012 | Compton et al. | |
| 8,203,615 B2 | 6/2012 | Wang et al. | |
| 8,203,633 B2 | 6/2012 | Adams, Jr. et al. | |
| 8,204,966 B1 | 6/2012 | Mendis et al. | |
| 8,212,711 B1 | 7/2012 | Schultz et al. | |
| 8,258,996 B2 | 9/2012 | Raney | |
| 8,274,422 B1 | 9/2012 | Smith et al. | |
| 8,299,959 B2 | 10/2012 | Vossiek et al. | |
| 8,358,359 B2 | 1/2013 | Baker et al. | |
| 8,362,944 B2 | 1/2013 | Lancashire | |
| 8,384,583 B2 | 2/2013 | Leva et al. | |
| 8,411,146 B2 | 4/2013 | Twede | |
| 8,441,393 B2 | 5/2013 | Strauch et al. | |
| 8,482,452 B2 | 7/2013 | Chambers et al. | |
| 8,487,996 B2 | 7/2013 | Mann et al. | |
| 8,493,262 B2 | 7/2013 | Boufounos et al. | |

(56) References Cited

U.S. PATENT DOCUMENTS

| | | |
|---|---|---|
| 8,493,264 B2 | 7/2013 | Sasakawa |
| 8,502,730 B2 | 8/2013 | Roche |
| 8,532,958 B2 | 9/2013 | Ingram et al. |
| 8,543,255 B2 | 9/2013 | Wood et al. |
| 8,558,735 B2 | 10/2013 | Bachmann et al. |
| 8,576,111 B2 | 11/2013 | Smith et al. |
| 8,594,375 B1 | 11/2013 | Padwick |
| 8,610,771 B2 | 12/2013 | Leung et al. |
| 8,698,668 B2 | 4/2014 | Hellsten |
| 8,711,029 B2 | 4/2014 | Ferretti et al. |
| 8,723,721 B2 | 5/2014 | Moruzzis et al. |
| 8,724,918 B2 | 5/2014 | Abraham |
| 8,760,634 B2 | 6/2014 | Rose |
| 8,768,104 B2 | 7/2014 | Moses et al. |
| 8,803,732 B2 | 8/2014 | Antonik et al. |
| 8,823,813 B2 | 9/2014 | Mantzel et al. |
| 8,824,544 B2 | 9/2014 | Nguyen et al. |
| 8,836,573 B2 | 9/2014 | Yanagihara et al. |
| 8,854,253 B2 | 10/2014 | Edvardsson |
| 8,854,255 B1 | 10/2014 | Ehret |
| 8,860,824 B2 | 10/2014 | Jelinek |
| 8,861,588 B2 | 10/2014 | Nguyen et al. |
| 8,879,793 B2 | 11/2014 | Peterson |
| 8,879,865 B2 | 11/2014 | Li et al. |
| 8,879,996 B2 | 11/2014 | Kenney et al. |
| 8,891,066 B2 | 11/2014 | Bamler et al. |
| 8,903,134 B2 | 12/2014 | Abileah |
| 8,912,950 B2 | 12/2014 | Adcook |
| 8,957,806 B2 | 2/2015 | Schaefer |
| 8,977,062 B2 | 3/2015 | Gonzalez et al. |
| 8,988,273 B2 | 3/2015 | Marianer et al. |
| 9,013,348 B2 | 4/2015 | Riedel et al. |
| 9,019,143 B2 | 4/2015 | Obermeyer |
| 9,019,144 B2 | 4/2015 | Calabrese |
| 9,037,414 B1 | 5/2015 | Pratt |
| 9,063,544 B2 | 6/2015 | Vian et al. |
| 9,071,337 B2 | 6/2015 | Hellsten |
| 9,106,857 B1 | 8/2015 | Faramarzpour |
| 9,126,700 B2 | 9/2015 | Ozkul et al. |
| 9,134,414 B2 | 9/2015 | Bergeron et al. |
| 9,148,601 B2 | 9/2015 | Fox |
| 9,176,227 B2 | 11/2015 | Bergeron et al. |
| 9,182,483 B2 | 11/2015 | Liu et al. |
| 9,210,403 B2 | 12/2015 | Martinerie et al. |
| 9,244,155 B2 | 1/2016 | Bielas |
| 9,261,592 B2 | 2/2016 | Boufounos et al. |
| 9,291,711 B2 | 3/2016 | Healy, Jr. et al. |
| 9,329,263 B2 | 5/2016 | Haynes et al. |
| 9,389,311 B1 | 7/2016 | Moya et al. |
| 9,395,437 B2 | 7/2016 | Ton et al. |
| 9,400,329 B2 | 7/2016 | Pillay |
| 9,411,039 B2 | 8/2016 | Dehlink et al. |
| 9,417,323 B2 | 8/2016 | Carande et al. |
| 9,426,397 B2 | 8/2016 | Wein |
| 9,529,081 B2 | 12/2016 | Whelan et al. |
| 9,531,081 B2 | 12/2016 | Huber et al. |
| 9,684,071 B2 | 6/2017 | Wishart |
| 9,684,673 B2 | 6/2017 | Beckett et al. |
| 10,230,925 B2 | 3/2019 | Maciejewski et al. |
| 2001/0013566 A1 | 8/2001 | Yung et al. |
| 2002/0003502 A1 | 1/2002 | Falk |
| 2002/0147544 A1 | 10/2002 | Nicosia et al. |
| 2002/0196178 A1 | 12/2002 | Beard |
| 2003/0006364 A1 | 1/2003 | Katzir et al. |
| 2004/0021600 A1 | 2/2004 | Wittenberg |
| 2004/0104859 A1 | 6/2004 | Lo |
| 2004/0150547 A1 | 8/2004 | Suess et al. |
| 2004/0227659 A1 | 11/2004 | Woodford et al. |
| 2005/0212692 A1 | 9/2005 | Iny et al. |
| 2005/0270299 A1 | 12/2005 | Rasmussen et al. |
| 2005/0288859 A1 | 12/2005 | Golding et al. |
| 2006/0132753 A1 | 6/2006 | Nichols et al. |
| 2007/0024879 A1 | 2/2007 | Hamilton, Jr. et al. |
| 2007/0051890 A1 | 3/2007 | Pittman |
| 2007/0080830 A1 | 4/2007 | Sacks |
| 2007/0102629 A1 | 5/2007 | Richard et al. |
| 2007/0120979 A1 | 5/2007 | Zhang et al. |
| 2007/0146195 A1 | 6/2007 | Wallenberg et al. |
| 2007/0168370 A1 | 7/2007 | Hardy |
| 2007/0192391 A1 | 8/2007 | McEwan |
| 2007/0279284 A1 | 12/2007 | Narayanan |
| 2008/0123997 A1 | 5/2008 | Adams et al. |
| 2008/0240602 A1 | 10/2008 | Adams et al. |
| 2009/0011777 A1 | 1/2009 | Grunebach et al. |
| 2009/0021588 A1 | 1/2009 | Border et al. |
| 2009/0046182 A1 | 2/2009 | Adams, Jr. et al. |
| 2009/0046995 A1 | 2/2009 | Kanumuri et al. |
| 2009/0051585 A1 | 2/2009 | Krikorian et al. |
| 2009/0087087 A1 | 4/2009 | Palum et al. |
| 2009/0147112 A1 | 6/2009 | Baldwin |
| 2009/0226114 A1 | 9/2009 | Choi et al. |
| 2009/0256909 A1 | 10/2009 | Nixon |
| 2009/0289838 A1 | 11/2009 | Braun |
| 2010/0039313 A1 | 2/2010 | Morris |
| 2010/0045513 A1 | 2/2010 | Pett et al. |
| 2010/0063733 A1 | 3/2010 | Yunck |
| 2010/0128137 A1 | 5/2010 | Guidash |
| 2010/0149396 A1 | 6/2010 | Summa et al. |
| 2010/0194901 A1 | 8/2010 | van Hoorebeke et al. |
| 2010/0232692 A1 | 9/2010 | Kumar et al. |
| 2010/0302418 A1 | 12/2010 | Adams, Jr. et al. |
| 2010/0309347 A1 | 12/2010 | Adams, Jr. et al. |
| 2010/0321235 A1 | 12/2010 | Vossiek et al. |
| 2010/0328499 A1 | 12/2010 | Sun |
| 2011/0052095 A1 | 3/2011 | Deever |
| 2011/0055290 A1 | 3/2011 | Li et al. |
| 2011/0098986 A1 | 4/2011 | Fernandes Rodrigues et al. |
| 2011/0115793 A1 | 5/2011 | Grycewicz |
| 2011/0115954 A1 | 5/2011 | Compton |
| 2011/0134224 A1 | 6/2011 | McClatchie |
| 2011/0156878 A1 | 6/2011 | Wu et al. |
| 2011/0187902 A1 | 8/2011 | Adams, Jr. et al. |
| 2011/0199492 A1 | 8/2011 | Kauker et al. |
| 2011/0279702 A1 | 11/2011 | Plowman et al. |
| 2011/0282871 A1 | 11/2011 | Seefeld et al. |
| 2012/0019660 A1 | 1/2012 | Golan et al. |
| 2012/0044328 A1 | 2/2012 | Gere |
| 2012/0076229 A1 | 3/2012 | Brobston et al. |
| 2012/0105276 A1 | 5/2012 | Ryland |
| 2012/0127331 A1 | 5/2012 | Grycewicz |
| 2012/0133550 A1 | 5/2012 | Benninghofen et al. |
| 2012/0146869 A1 | 6/2012 | Holland et al. |
| 2012/0154203 A1 | 6/2012 | Vacanti et al. |
| 2012/0154584 A1 | 6/2012 | Omer et al. |
| 2012/0200703 A1 | 8/2012 | Nadir et al. |
| 2012/0201427 A1 | 8/2012 | Jasinski et al. |
| 2012/0257047 A1 | 10/2012 | Biesemans et al. |
| 2012/0271609 A1 | 10/2012 | Laake et al. |
| 2012/0274505 A1 | 11/2012 | Pritt et al. |
| 2012/0293669 A1 | 11/2012 | Mann et al. |
| 2012/0323992 A1 | 12/2012 | Brobst et al. |
| 2013/0021475 A1 | 1/2013 | Canant et al. |
| 2013/0050488 A1 | 2/2013 | Brouard et al. |
| 2013/0063489 A1 | 3/2013 | Hourie et al. |
| 2013/0080594 A1 | 3/2013 | Nourse et al. |
| 2013/0120205 A1 | 5/2013 | Thomson et al. |
| 2013/0169471 A1 | 7/2013 | Lynch |
| 2013/0169485 A1 | 7/2013 | Lynch |
| 2013/0201050 A1 | 8/2013 | Hellsten |
| 2013/0234879 A1 | 9/2013 | Wilson-Langman et al. |
| 2013/0257641 A1 | 10/2013 | Ronning |
| 2013/0293411 A1 | 11/2013 | Dehlink et al. |
| 2013/0321228 A1 | 12/2013 | Crockett, Jr. et al. |
| 2013/0321229 A1 | 12/2013 | Klefenz et al. |
| 2013/0335256 A1 | 12/2013 | Smith et al. |
| 2014/0027576 A1 | 1/2014 | Boshuizen et al. |
| 2014/0062764 A1 | 3/2014 | Reis et al. |
| 2014/0068439 A1 | 3/2014 | Lacaze et al. |
| 2014/0078153 A1 | 3/2014 | Richardson |
| 2014/0149372 A1 | 5/2014 | Sankar et al. |
| 2014/0191894 A1 | 7/2014 | Chen et al. |
| 2014/0232591 A1 | 8/2014 | Liu et al. |
| 2014/0266868 A1 | 9/2014 | Schuman |
| 2014/0282035 A1 | 9/2014 | Murthy et al. |

(56) References Cited

U.S. PATENT DOCUMENTS

| | | |
|---|---|---|
| 2014/0307950 A1 | 10/2014 | Jancsary et al. |
| 2014/0313071 A1 | 10/2014 | McCorkle |
| 2014/0344296 A1 | 11/2014 | Chawathe et al. |
| 2015/0015692 A1 | 1/2015 | Smart |
| 2015/0080725 A1 | 3/2015 | Wegner |
| 2015/0145716 A1 | 5/2015 | Woodsum |
| 2015/0160337 A1 | 6/2015 | Muff |
| 2015/0168554 A1 | 6/2015 | Aharoni et al. |
| 2015/0247923 A1 | 9/2015 | LaBarca et al. |
| 2015/0253423 A1 | 9/2015 | Liu et al. |
| 2015/0280326 A1 | 10/2015 | Arii |
| 2015/0323659 A1 | 11/2015 | Mitchell |
| 2015/0323665 A1 | 11/2015 | Murata |
| 2015/0323666 A1 | 11/2015 | Murata |
| 2015/0324989 A1 | 11/2015 | Smith et al. |
| 2015/0331097 A1 | 11/2015 | Hellsten |
| 2015/0346336 A1 | 12/2015 | Di Giorgio et al. |
| 2015/0369913 A1 | 12/2015 | Jung et al. |
| 2015/0371431 A1 | 12/2015 | Korb et al. |
| 2015/0378004 A1 | 12/2015 | Wilson-Langman et al. |
| 2015/0378018 A1 | 12/2015 | Calabrese |
| 2015/0379957 A1 | 12/2015 | Roegelein et al. |
| 2016/0012367 A1 | 1/2016 | Korb et al. |
| 2016/0019458 A1* | 1/2016 | Kaufhold ............ G06N 3/0463 342/25 F |
| 2016/0020848 A1 | 1/2016 | Leonard |
| 2016/0033639 A1 | 2/2016 | Jung et al. |
| 2016/0109570 A1 | 4/2016 | Calabrese |
| 2016/0139259 A1 | 5/2016 | Rappaport et al. |
| 2016/0139261 A1 | 5/2016 | Becker |
| 2016/0170018 A1 | 6/2016 | Yamaoka |
| 2016/0202347 A1 | 7/2016 | Malinovskiy et al. |
| 2016/0204514 A1 | 7/2016 | Miraftab et al. |
| 2016/0216372 A1 | 7/2016 | Liu et al. |
| 2016/0223642 A1 | 8/2016 | Moore et al. |
| 2016/0238696 A1 | 8/2016 | Hintz |
| 2016/0282457 A1* | 9/2016 | Mazzaro ............ G01S 13/106 |
| 2016/0282463 A1 | 9/2016 | Guy et al. |
| 2016/0300375 A1 | 10/2016 | Beckett et al. |
| 2016/0306824 A1 | 10/2016 | Lopez et al. |
| 2017/0160381 A1 | 6/2017 | Cho et al. |
| 2017/0170567 A1 | 6/2017 | Luo et al. |
| 2017/0214889 A1 | 7/2017 | Maciejewski et al. |
| 2018/0172823 A1 | 6/2018 | Tyc |
| 2018/0172824 A1 | 6/2018 | Beckett et al. |
| 2018/0252807 A1 | 9/2018 | Fox |
| 2018/0322784 A1 | 11/2018 | Schild |
| 2018/0335518 A1 | 11/2018 | Fox |
| 2018/0366837 A1 | 12/2018 | Fox et al. |

FOREIGN PATENT DOCUMENTS

| | | |
|---|---|---|
| CA | 2 553 008 C | 8/2011 |
| CA | 2 827 279 A1 | 4/2014 |
| CN | 101907704 A | 12/2010 |
| CN | 102394379 A | 3/2012 |
| CN | 102983410 A | 3/2013 |
| CN | 103414027 A | 11/2013 |
| CN | 103679714 A | 3/2014 |
| DE | 10 2007 039 095 A1 | 2/2009 |
| DE | 20 2009 003 286 U1 | 7/2009 |
| EP | 0 924 534 A2 | 6/1999 |
| EP | 0 846 960 B1 | 3/2004 |
| EP | 1 504 287 | 2/2005 |
| EP | 1 698 856 A2 | 9/2006 |
| EP | 1 509 784 B1 | 2/2008 |
| EP | 1 746 437 B1 | 9/2008 |
| EP | 2 230 533 A1 | 9/2010 |
| EP | 2 242 252 A2 | 10/2010 |
| EP | 2 416 174 A1 | 2/2012 |
| EP | 2 392 943 B1 | 11/2012 |
| EP | 2 560 144 A2 | 2/2013 |
| EP | 2 610 636 A1 | 7/2013 |
| EP | 2 762 916 A2 | 8/2014 |
| EP | 2 778 635 A1 | 9/2014 |
| EP | 2 828 685 | 1/2015 |
| EP | 2 875 384 | 5/2015 |
| EP | 2 662 704 B1 | 1/2016 |
| EP | 2 743 727 B1 | 1/2016 |
| EP | 2 759 847 B1 | 1/2016 |
| EP | 2 762 917 B1 | 1/2016 |
| EP | 2 767 849 B1 | 1/2016 |
| EP | 2 896 971 B1 | 3/2016 |
| EP | 3 012 658 A1 | 4/2016 |
| EP | 3 032 648 A1 | 6/2016 |
| EP | 3 056 922 A2 | 8/2016 |
| EP | 3 060 939 | 8/2016 |
| EP | 2 784 537 B1 | 10/2016 |
| EP | 3 077 985 | 10/2016 |
| EP | 3 077 986 | 10/2016 |
| EP | 1 966 630 B1 | 4/2017 |
| EP | 3 214 460 A1 | 9/2017 |
| JP | 56-108976 A | 8/1981 |
| JP | 60-257380 A | 12/1985 |
| JP | 2001-122199 A | 5/2001 |
| JP | 4917206 B2 | 4/2012 |
| KR | 10-2010-0035056 A | 4/2010 |
| KR | 10-2012-0000842 A | 1/2012 |
| KR | 10-1461129 B1 | 11/2014 |
| KR | 10-2016-0002694 A | 1/2016 |
| RU | 2 349 513 C2 | 3/2009 |
| WO | 00/55602 A1 | 9/2000 |
| WO | 02/18874 A1 | 3/2002 |
| WO | 03/005059 A1 | 1/2003 |
| WO | 03/040653 A1 | 5/2003 |
| WO | 03/055080 A2 | 7/2003 |
| WO | 03/096064 A1 | 11/2003 |
| WO | 2007/076824 A2 | 7/2007 |
| WO | 2009/025825 A1 | 2/2009 |
| WO | 2009/030339 A1 | 3/2009 |
| WO | 2009/085305 A1 | 7/2009 |
| WO | 2010/052530 A1 | 5/2010 |
| WO | 2010/122327 A1 | 10/2010 |
| WO | 2011/138744 A2 | 11/2011 |
| WO | 2011/154804 A1 | 12/2011 |
| WO | 2012/120137 A1 | 9/2012 |
| WO | 2012/143756 A1 | 10/2012 |
| WO | 2012/148919 A2 | 11/2012 |
| WO | 2013/112955 A1 | 8/2013 |
| WO | 2013/162657 A1 | 10/2013 |
| WO | 2014/012828 A1 | 1/2014 |
| WO | 2014/089318 A1 | 6/2014 |
| WO | 2014/097263 A1 | 6/2014 |
| WO | 2015/059043 A1 | 4/2015 |
| WO | 2015/112263 A2 | 7/2015 |
| WO | 2015/130365 A2 | 9/2015 |
| WO | 2015/192056 A1 | 12/2015 |
| WO | 2016/022637 A1 | 2/2016 |
| WO | 2016/132106 A1 | 8/2016 |
| WO | 2016/153914 A1 | 9/2016 |
| WO | 2016/202662 A1 | 12/2016 |
| WO | 2016/205406 A1 | 12/2016 |
| WO | 2017/0031013 A1 | 2/2017 |
| WO | 2017/044168 A2 | 3/2017 |
| WO | 2017/048339 A1 | 3/2017 |
| WO | 2017/094157 A1 | 6/2017 |

OTHER PUBLICATIONS

Huang et al., "Analog Beamforming and Digital Beamforming on Receive for Range Ambiguity Suppression in Spaceborne SAR," *International Journal of Antennas and Propagation* 2015:182080, 2015. (7 pages).

Huang et al., "ASTC-MIMO-TOPS Mode with Digital Beam-Forming in Elevation for High-Resolution Wide-Swath Imaging," *Remote Sensing* 7(3):2952-2970, 2015.

International Search Report and Written Opinion, dated Sep. 13, 2018, for International Application No. PCT/US2018/033970, 15 pages.

International Search Report and Written Opinion, dated Sep. 13, 2018, for International Application No. PCT/US2018/033971, 13 pages.

(56) References Cited

OTHER PUBLICATIONS

International Search Report and Written Opinion, dated Sep. 13, 2018, for International Application No. PCT/US2018/034144, 11 pages.
International Search Report and Written Opinion, dated Sep. 13, 2018, for International Application No. PCT/US2018/034146, 8 pages.
Krieger et al., "CEBRAS: Cross Elevation Beam Range Ambiguity Suppression for HighResolution Wide-Swath and MIMO-SAR Imaging," *International Geoscience and Remote Sensing Symposium*, Milan, Italy, Jul. 26-31, 2015, pp. 196-199.
Krieger et al., "Multidimensional Waveform Encoding: A New Digital Beamforming Technique for Synthetic Aperture Radar Remote Sensing," *IEEE Transactions on Geoscience and Remote Sensing* 46(1):31-46, 2008.
Office Action, dated Feb. 11, 2019, for U.S. Appl. No. 15/502,468, Fox, "Apparatus and Methods for Quad-Polarized Synthetic Aperture Radar," 42 pages.
Wu et al., "Simultaneous transmit and receive polarimetric synthetic aperture radar based on digital beamforming," *4th International Conference on Mechatronics, Materials, Chemistry and Computer Engineering*, Xi'An, China, Dec. 12-13, 2015, pp. 1283-1288.
"ISR Systems and Technology," Lincoln Laboratory, Massachusetts Institute of Technology, archived Jan. 19, 2017, URL=https://www.ll.mit.edu/mission/isr/israccomplishments.html, download date Oct. 8, 2018, 2 pages.
"Northrop's SABR radar completes auto target cueing capability demonstration," May 20, 2013, URL=https://www.airforce-technology.com/news/newsnorthrops-sabr-radar-completes-auto-target-cueing-capability-demonstration/, download date Oct. 8, 2018, 3 pages.
Analog Devices, "Fundamentals of Direct Digital Synthesis (DDS)," MT-085 Tutorial, 2008, 9 pages.
Beckett, "UrtheCast Second-Generation Earth Observation Sensors," *36th International Symposium on Remote Sensing of Environment*, Berlin, Germany, May 11-15, 2015, pp. 1069-1073.
Bickel et al., "Effects of Magneto-Ionic Propagation on the Polarization Scattering Matrix," *Proceedings of the IEEE* 53(8):1089-1091, 1965.
Bidigare, "MIMO Capacity of Radar as a Communications Channel," *Adaptive Sensor and Array Processing Workshop*, Lexington, Massachusetts, USA, Mar. 11-13, 2003, 19 pages.
Boccia, "Bathymetric Digital Elevation Model Generation from L-band and X-band Synthetic Aperture Radar Images in the Gulf of Naples, Italy: Innovative Techniques and Experimental Results," doctoral thesis, University of Naples Federico II, Naples, Italy, 2015, 161 pages.
Bordoni et al., "Calibration Error Model for Multichannel Spaceborne SAR Systems Based on Digital Beamforming," *10th European Radar Conference*, Nuremberg, Germany, Oct. 9-11, 2013, pp. 184-187.
Brysk, "Measurement of the Scattering Matrix with an Intervening Ionosphere," *Transactions of the American Institute of Electrical Engineers* 77(5):611-612, 1958.
Caltagirone et al., "The COSMO-SkyMed Dual Use Earth Observation Program: Development, Qualification, and Results of the Commissioning of the Overall Constellation," *IEEE Journal of Selected Topics in Applied Earth Observations and Remote Sensing* 7(7):2754-2762, 2014.
D'Aria et al., "A Wide Swath, Full Polarimetric, L band spaceborne SAR," *IEEE Radar Conference*, Piscataway, New Jersey, USA, May 26, 2008, 4 pages.
Di Iorio et al., "Innovation Technologies and Applications for Coastal Archaeological sites FP7—ITACA," *36th International Symposium on Remote Sensing of Environment*, Berlin, Germany, May 11-15, 2015, pp. 1367-1373.
El Sanhoury et al., "Performance Improvement of Pulsed OFDM UWB Systems Using ATF coding," *International Conference on Computer and Communication Engineering*, Kuala Lumpur, Malaysia, May 11-13, 2010, 4 pages.
European Partial Search Report, dated Dec. 21, 2017, for European Application No. 15829734.1-1812, 16 pages.
European Partial Search Report, dated May 18, 2018, for European Application No. 16846990.6-1206, 16 pages.
Evans, "Venus, Unmasked: 25 Years Since the Arrival of Magellan at Earth's Evil Twin," Aug. 10, 2015, URL=http://www.americaspace.com/2015/08/10/venus-unmasked-25-years-since-the-arrival-of-magellan-at-earths-evil-twin/, download date Oct. 8, 2018, 4 pages.
Extended European Search Report, dated Apr. 25, 2018, for European Application No. 16844829.8-1205, 9 pages.
Extended European Search Report, dated Aug. 16, 2018, for European Application No. 16846990.6-1206, 16 pages.
Extended European Search Report, dated Mar. 27, 2018, for European Application No. 15829734.1-1206, 18 pages.
Fard et al., "Classifier Fusion of High-Resolution Optical and Synthetic Aperture Radar (SAR) Satellite Imagery for Classification in Urban Area," *1st International Conference on Geospatial Information Research*, Tehran, Iran, Nov. 15-17, 2014, 5 pages.
Forkuor et al., "Integration of Optical and Synthetic Aperture Radar Imagery for Improving Crop Mapping in Northwestern Benin, West Africa," *Remote Sensing* 6(7):6472-6499, 2014.
Fox et al., "Apparatus and Methods for a Synthetic Aperture Radar With Multi-Aperture Antenna," U.S. Appl. No. 62/510,182, filed May 23, 2017, 42 pages.
Fox et al., "Apparatus and Methods for a Synthetic Aperture Radar With Self-Cueing," U.S. Appl. No. 62/510,132, filed May 23, 2017, 39 pages.
Fox et al., "Range Ambiguity Suppression in Digital Multibeam," U.S. Appl. No. 62/590,153, filed Nov. 22, 2017, 19 pages.
Fox et al., "Synthetic Aperture Radar Imaging Apparatus and Methods for Moving Targets," U.S. Appl. No. 62/510,191, filed May 23, 2017, 24 pages.
Fox, "Apparatus and Methods for Quad-Polarized Synthetic Aperture Radar," U.S. Appl. No. 62/035,279, filed Aug. 8, 2014, 52 pages.
Fox, "Apparatus and Methods for Synthetic Aperture Radar With Digital Beamforming," U.S. Appl. No. 62/137,934, filed Mar. 25, 2015, 45 pages.
Fox, "Efficient Planar Phased Array Antenna Assembly," U.S. Appl. No. 62/180,421, filed Jun. 16, 2015, 33 pages.
Fox, "Synthetic Aperture Radar Imaging Apparatus and Methods," U.S. Appl. No. 62/260,063, filed Nov. 25, 2015, 41 pages.
Fox, "Synthetic Aperture Radar Imaging Apparatus and Methods," U.S. Appl. No. 62/510,123, filed May 23, 2017, 74 pages.
Freeman et al., "On the Detection of Faraday Rotation in Linearly Polarized L-Band SAR Backscatter Signatures," *IEEE Transactions on Geoscience and Remote Sensing* 42(8):1607-1616, 2004.
Freeman et al., "The "Myth" of the Minimum SAR Antenna Area Constraint," *IEEE Transactions on Geoscience and Remote Sensing* 38(1):320-324, 2000.
Giuli et al., "Radar target scattering matrix measurement through orthogonal signals," *IEE Proceedings Part F: Communications, Radar & Signal Processing* 140(4):233-242, 1993.
Hadjis, "Automatic Modulation Classification of Common Communication and Pulse Compression Radar Waveforms Using Cyclic Features," master's thesis, Air Force Institute of Technology, Wright-Patterson Air Force Base, Ohio, USA, Mar. 2013, 96 pages.
Heege et al., "Mapping of water depth, turbidity and sea state properties using multiple satellite sensors in aquatic systems," *Hydro 2010*, Rostock, Germany, Nov. 2-5, 2010, 27 pages.
Hoogeboom et al., "Integrated Observation Networks of the Future," *4th Forum on Global Monitoring for Environment and Security*, Baveno, Italy, Nov. 26-28, 2003, 14 pages.
Hossain et al., "Multi-Frequency Image Fusion Based on MIMO UWB OFDM Synthetic Aperture Radar," Chapter 3, in Miao (ed.), *New Advances in Image Fusion*, InTech, 2013, pp. 37-55. (21 pages).
Hounam et al., "A Technique for the Identification and Localization of SAR Targets Using Encoding Transponders," *IEEE Transactions on Geoscience and Remote Sensing* 39(1):3-7, 2001.
International Search Report and Written Opinion, dated Feb. 13, 2017, for International Application No. PCT/US2016/063630, 8 pages.

(56) References Cited

OTHER PUBLICATIONS

International Search Report and Written Opinion, dated Feb. 16, 2017, for International Application No. PCT/US2016/037675, 10 pages.
International Search Report and Written Opinion, dated Jun. 3, 2016, for International Application No. PCT/US2016/022841, 10 pages.
International Search Report and Written Opinion, dated Mar. 27, 2017, for International Application No. PCT/US2016/037666, 8 pages.
International Search Report and Written Opinion, dated Nov. 11, 2015, for International Application No. PCT/US2015/043739, 12 pages.
Kankaku et al., "The Overview of the L-band SAR Onboard ALOS-2," *Progress in Electromagnetics Research Symposium Proceedings*, Moscow, Russia, Aug. 18-21, 2009, pp. 735-738.
Kimura, "Calibration of Polarimetric PALSAR Imagery Affected by Faraday Rotation Using Polarization Orientation," *IEEE Transactions on Geoscience and Remote Sensing* 47(12):3943-3950, 2009.
Larson et al. (eds.), *Space Mission Analysis and Design*, 2$^{nd}$ ed., Springer Netherlands, Dordrecht, Netherlands, 1992, pp. 153-154; 177-189.
Linne von Berg, "Autonomous Networked Multi-Sensor Imaging Systems," *Imaging Systems and Applications*, Monterey, California, USA, Jun. 24-28, 2012, 2 pages.
Linne von Berg, "Multi-Sensor Airborne Imagery Collection and Processing Onboard Small Unmanned Systems," *Proceedings of SPIE* 7668(1):766807, 2010. (11 pages).
Livingstone et al., "RADARSAT-2 System and Mode Description," *Systems Concepts and Integration Symposium*, Colorado Springs, Colorado, USA, Oct. 10-12, 2005, 22 pages.
Lombardo et al., "Monitoring and surveillance potentialities obtained by splitting the antenna of the COSMO-SkyMed SAR into multiple sub-apertures," *IEE Proceedings—Radar, Sonar and Navigation* 153(2):104-116, 2006.
Ma, "Application of RADARSAT-2 Polarimetric Data for Land Use and Land Cover Classification and Crop Monitoring in Southwestern Ontario," master's thesis, The University of Western Ontario, Canada, 2013, 145 pages.
Meyer et al., "Prediction, Detection, and Correction of Faraday Rotation in Full-Polarimetric L-Band SAR Data," *IEEE Transactions on Geoscience and Remote Sensing* 46(10):3076-3086, 2008.
National Instruments, "Direct Digital Synthesis," white paper, Dec. 30, 2016, 5 pages.
Pleskachevsky et al., "Synergy and fusion of optical and synthetic aperture radar satellite data for underwater topography estimation in coastal areas," *Ocean Dynamics* 61(12):2099-2120, 2011.
Preliminary Amendment, filed Dec. 15, 2017, for U.S. Appl. No. 15/737,016, Tyc, "Systems and Methods for Remote Sensing of the Earth From Space," 11 pages.
Preliminary Amendment, filed Dec. 15, 2017, for U.S. Appl. No. 15/737,065, Fox et al., "Efficient Planar Phased Array Antenna Assembly," 8 pages.
Preliminary Amendment, filed Feb. 7, 2017, for U.S. Appl. No. 15/502,468, Fox, "Apparatus and Methods for Quad-Polarized Synthetic Aperture Radar," 12 pages.
Preliminary Amendment, filed Sep. 25, 2017, for U.S. Appl. No. 15/561,437, Fox, "Apparatus and Methods for Synthetic Aperture Radar With Digital Beamforming," 11 pages.
Raney, "Hybrid-Polarity SAR Architecture," *IEEE Transactions on Geoscience and Remote Sensing* 45(11):3397-3404, 2007.
Raouf et al., "Integrated Use of SAR and Optical Data for Coastal Zone Management," *Proceedings of the 3$^{rd}$ European Remote Sensing Symposium* vol. 2, Florence, Italy, Mar. 14-21, 1997, pp. 1089-1094.
Richardson, "By the Doppler's sharp stare," Oct. 1, 2003, *Armada International*, URL=https://www.thefreelibrary.com/_/print/PrintArticle.aspx?id=111508265, download date Oct. 8, 2018, 7 pages.
Rosen et al., "Techniques and Tools for Estimating Ionospheric Effects in Interferometric and Polarimetric SAR Data," *International Geoscience and Remote Sensing Symposium*, Vancouver, British Columbia, Canada, Jul. 24-29, 2011, pp. 1501-1504.
Rossler, "Adaptive Radar with Application to Joint Communication and Synthetic Aperture Radar (CoSAR)," doctoral dissertation, The Ohio State University, Columbus, Ohio, USA, 2013, 117 pages.
Rouse et al., "Swathbuckler Wide Area SAR Processing Front End," *IEEE Conference on Radar*, Verona, New York, USA, Apr. 24-27, 2006, 6 pages.
Rudolf, "Increase of Information by Polarimetric Radar Systems," Doctoral Dissertation, Institut für Höchstfrequenztechnik und Elektronik der Universität Karlsruhe, Karlsruhe, Germany, 2000, pp. 26-27. (5 pages).
Sakiotis et al., "Ferrites at Microwaves," *Proceedings of the IRE* 41(1):87-93, 1953.
Sano et al., "Synthetic Aperture Radar (L band) and Optical Vegetation Indices for Discriminating the Brazilian Savanna Physiognomies: A Comparative Analysis," *Earth Interactions* 9(15):15, 2005. (15 pages).
Souissi et al., "Investigation of the capability of the Compact Polarimetry mode to Reconstruct Full Polarimetry mode using RADARSAT2 data," *Advanced Electromagnetics* 1(1):19-28, 2012.
Space Dynamics Laboratory, "RASAR: Real-time, Autonomous, Synthetic Aperture Radar," Fact Sheet, 2013, 2 pages.
Stofan et al., "Overview of Results of Spaceborne Imaging Radar-C, X-Band Synthetic Aperture Radar (SIR-C/X-SAR)," *IEEE Transactions on Geoscience and Remote Sensing* 33(4):817-828, 1995.
Stralka, "Applications of Orthogonal Frequency-Division Multiplexing (OFDM) to Radar," doctoral dissertaion, Johns Hopkins University, Baltimore, Maryland, USA, Mar. 2008, 196 pages.
Tyc, "Systems and Methods for Remote Sensing of the Earth From Space," U.S. Appl. No. 62/180,440, filed Jun. 16, 2015, 29 pages.
Van Zyl et al., "Synthetic Aperture Radar Polarimetry," in Yuen (ed.), *JPL Space Science and Technology Series*, Jet Propulsion Laboratory, California Institute of Technology, 2010, 333 pages.
Wall et al., "User Guide to the Magellan Synthetic Aperture Radar Images," Jet Propulsion Laboratory, Pasadena, California, USA, Mar. 1995, 210 pages.
Werninghaus et al., "The TerraSAR-X Mission," 5$^{th}$ *European Conference on Synthetic Aperture Radar*, Ulm, Germany, May 25-27, 2004, 4 pages.
Wolff, "Radar Basics—Exciter," URL=http://www.radartutorial.eu/08.transmitters/Exciter.en.html, download date Mar. 6, 2018, 2 pages.
Wright et al., "Faraday Rotation Effects on L-Band Spaceborne SAR Data," *IEEE Transactions on Geoscience and Remote Sensing* 41(12):2735-2744, 2003.
Xia et al., "Classification of High Resolution Optical and SAR Fusion Image Using Fuzzy Knowledge and Object-Oriented Paradigm," *Geographic Object-Based Image Analysis* vol. XXXVIII-4/C7, Ghent, Belgium, Jun. 29-Jul. 2, 2010, 5 pages.
Zhang et al., "OFDM Synthetic Aperture Radar Imaging With Sufficient Cyclic Prefix," *IEEE Transactions on Geoscience and Remote Sensing* 53(1):394-404, 2015.
Extended European Search Report, dated Jun. 3, 2019, for European Application No. 16869291.1-1206, 5 pages.
Amendment, filed Jan. 17, 2019, for U.S. Appl. No. 15/101,336, Lopez et al., "Systems and Methods for Earth Observation," 25 pages.
Amendment, filed Sep. 5, 2018, for U.S. Appl. No. 15/316,469, Maciejewski et al., "Systems and Methods for Processing and Providing Terrestrial and/or Space-Based Earth Observation Video," 9 pages.
Beckett et al., "Systems and Methods for Enhancing Synthetic Aperture Radar Imagery," U.S. Appl. No. 62/180,449, filed Jun. 16, 2015, 34 pages.
European Office Action, dated Nov. 24, 2017, for European Application No. 14883549.9-1871, 8 pages.
Extended European Search Report, dated May 14, 2018, for European Application No. 16812363.6-1206, 8 pages.
Extended European Search Report, dated Oct. 24, 2016, for European Application No. 14880012.1-1951, 10 pages.
Extended European Search Report, dated Oct. 24, 2016, for European Application No. 14883549.9-1951, 10 pages.

(56) References Cited

OTHER PUBLICATIONS

Foody, G.M., "Status of land cover classification accuracy assessment", Remote Sensing of Environment, vol. 80, 2002, pp. 185-201.
International Preliminary Report on Patentability, dated Dec. 15, 2016, for International Application No. PCT/US2015/035628, 8 pages.
International Preliminary Report on Patentability, dated Dec. 19, 2017, for International Application No. PCT/US2016/037666, 6 pages.
International Preliminary Report on Patentability, dated Dec. 19, 2017, for International Application No. PCT/US2016/037675, 8 pages.
International Preliminary Report on Patentability, dated Dec. 19, 2017, for International Application No. PCT/US2016/037681, 6 pages.
International Preliminary Report on Patentability, dated Feb. 14, 2017, for International Application No. PCT/US2015/043739, 10 pages.
International Preliminary Report on Patentability, dated Jun. 7, 2016, for International Application No. PCT/US2014/068642, 10 pages.
International Preliminary Report on Patentability, dated Jun. 7, 2016, for International Application No. PCT/US2014/068645, 14 pages.
International Preliminary Report on Patentability, dated May 29, 2018, for International Application No. PCT/US2016/063630, 6 pages.
International Preliminary Report on Patentability, dated Sep. 26, 2017, for International Application No. PCT/US2016/022841, 7 pages.
International Search Report and Written Opinion, dated Aug. 27, 2015, for International Application No. PCT/US2014/068642, 13 pages.
International Search Report and Written Opinion, dated Sep. 2, 2015, for International Application No. PCT/US2014/068645, 16 pages.
International Search Report and Written Opinion, dated Sep. 21, 2015, for International Application No. PCT/US2015/035628, 10 pages.
International Search Report and Written Opinion, dated Sep. 23, 2016, for International Application No. PCT/US2016/037681, 8 pages.
Lopez et al., "Systems and Methods for Earth Observation," U.S. Appl. No. 61/911,914, filed Dec. 4, 2013, 177 pages.
Maciejewski et al., "Systems and Methods for Processing and Providing Video," U.S. Appl. No. 62/011,935, filed Jun. 13, 2014, 52 pages.
Makar et al., "Real-Time Video Streaming With Interactive Region-of-Interest," *Proceedings of 2010 IEEE 17th International Conference on Image Processing*, Hong Kong, China, Sep. 26-29, 2010, pp. 4437-4440.
Meilland et al., "A Unified Rolling Shutter and Motion Blur Model for 3D Visual Registration," *IEEE International Conference on Computer Vision*, Sydney, Australia, Dec. 1-8, 2013, pp. 2016-2023.
Notice of Allowance, dated Mar. 9, 2017, for U.S. Appl. No. 15/101,344, Beckett et al., "Systems and Methods for Processing and Distributing Earth Observation Images," 9 pages.
Notice of Allowance, dated Oct. 18, 2018, for U.S. Appl. No. 15/316,469, Maciejewski et al., "Systems and Methods for Processing and Providing Terrestrial and/or Space-Based Earth Observation Video," 8 pages.
Office Action, dated Apr. 23, 2018, for U.S. Appl. No. 15/316,469, Maciejewski et al., "Systems and Methods for Processing and Providing Terrestrial and/or Space-Based Earth Observation Video," 21 pages.
Office Action, dated Aug. 6, 2018, for U.S. Appl. No. 15/101,336, Lopez et al., "Systems and Methods for Earth Observation," 25 pages.
Preliminary Amendment, filed Dec. 15, 2017, for U.S. Appl. No. 15/737,044, Beckett et al., "Systems and Methods for Enhancing Synthetic Aperture Radar Imagery," 10 pages.
Preliminary Amendment, filed Dec. 5, 2016, for U.S. Appl. No. 15/316,469, Maciejewski et al., "Systems and Methods for Processing and Providing Terrestrial and/or Space-Based Earth Observation Video," 9 pages.
Preliminary Amendment, filed Jun. 2, 2016, for U.S. Appl. No. 15/101,336, Lopez et al., "Systems and Methods for Earth Observation," 9 pages.
Preliminary Amendment, filed Jun. 2, 2016, for U.S. Appl. No. 15/101,344, Beckett et al., "Systems and Methods for Processing and Distributing Earth Observation Images," 11 pages.
Research Systems Inc., "ENVI Tutorials," ENVI Version 3.4, Sep. 2000, 590 pages.
Šindelář et al., "A Smartphone Application for Removing Handshake Blur and Compensating Rolling Shutter," *IEEE International Conference on Image Processing*, Paris, France, Oct. 27-30, 2014, pp. 2160-2162.
Šindelář et al., "Image deblurring in smartphone devices using built-in inertial measurement sensors," *Journal of Electronic Imaging* 22(1):011003, 2013. (22 pages).
Communication pursuant to Article 94(3) EPC, dated Jun. 4, 2020, for European application No. 16 846 990.6-1206, 5 pages.
Envi Tutorials, dated Sep. 1, 2000. URL: http://heim.ifi.uio.no/ "infl60/tutorial.pdf 590 pages.
International Preliminary Report on Patentability and Written Opinion, for International Application No. PCT/US2018/062353, 6 pages.
International Preliminary Report on Patentability and Written Opinion dated Sep. 13, 2018, for International Application No. PCT/US2018/034144, 8 pages.
International Preliminary Report on Patentability and Written Opinion dated Sep. 13, 2018, for International Application No. PCT/US2018/033971, 10 pages.
International Preliminary Report on Patentability and Written Opinion dated Sep. 13, 2018, for International Application No. PCT/US2018/033970, 12 pages.
International Preliminary Report on Patentability and Written Opinion dated Sep. 13, 2018 for International Application No. PCT/US2018/34146, 6 pages.
International Search Report dated Sep. 23, 2016 for International Application No. PCT/US2016/037681, 3 pages.
Office Action dated Oct. 18, 2019, for U.S. Appl. No. 15/737,016, George Tyc, "Systems and Methods for Remote Sensing of the Earth From Space," 18 pages.
Supplementary partial European Search Report dated May 18, 2018, for European Application No. 16846990.6, 6 pages.

\* cited by examiner

SYNTHETIC APERTURE RADAR IMAGING APPARATUS AND METHODS

BACKGROUND

Technical Field

The present application relates generally to synthetic aperture radar (SAR) and, more particularly, to operating modes suitable for situational awareness.

Description of the Related Art

A synthetic aperture radar (SAR) is an imaging radar. The SAR exploits the relative motion of the radar and a target of interest to obtain high azimuthal resolution. High range resolution can be achieved using pulse compression techniques. The SAR is typically flown on an aircraft, a spacecraft, unmanned aerial vehicle (UAV) such as a drone, or another suitable platform. The target of interest is typically on the ground, and can be a point target or a distributed target. The SAR can be a component of a SAR imaging system, the system also including at least one of data processing and data distribution components.

In conventional operation of the SAR imaging system, the system is tasked to obtain images of a target or a swath. Data is collected on-board the platform. In the case of a spaceborne SAR, the data is collected on-board the spacecraft, and either processed on-board the spacecraft and downlinked to the ground, or downlinked and processed on the ground to generate the images. The images are distributed to the user, typically via a network.

BRIEF SUMMARY

A method of operation of a synthetic aperture radar (SAR) comprising a transceiver and a hardware data processor may be summarized as including: causing by the data processor the SAR to enter an interrogation mode; transmitting by the transceiver one or more interrogation pulses to the ground; determining by the data processor if a response to the one or more interrogation pulses has been received from a ground terminal; determining by the data processor if position information specifying a ground location has been received from the ground terminal; upon determining by the data processor a response to the one or more interrogation pulses has been received from the ground terminal, and position information specifying a ground location has been received from the ground terminal, causing by the data processor the SAR to enter a self-imaging mode; transmitting by the transceiver a first transmitted pulse to the ground; receiving by the transceiver a first received pulse that includes the first transmitted pulse backscattered from the ground; encoding by the data processor the first received pulse to generate a subsequent transmitted pulse; and transmitting by the transceiver the subsequent transmitted pulse to the ground.

Encoding the first received pulse by the data processor to generate a subsequent transmitted pulse may include modulating by the data processor the first received pulse by at least one of phase-shift keying (PSK) or amplitude and phase-shift keying (APSK) to generate a modulated first received pulse; and convolutionally encoding by the data processor the modulated first received pulse to generate an encoded first received pulse. Encoding by the data processor the first received pulse to generate a subsequent transmitted pulse may further include encrypting by the data processor the encoded first received pulse to generate an encrypted subsequent transmitted pulse.

In any of the above described implementations, transmitting one or more interrogation pulses to the ground by the transceiver may include transmitting by the transceiver one or more pulses in a broad-beam mode of the SAR. Transmitting by the transceiver one or more interrogation pulses in a broad-beam mode of the SAR may include transmitting by the transceiver one or more pulses at a pulse repetition frequency in a range of 0.5 Hz to 50 Hz.

The method of operation of a SAR may be summarized as further including: receiving a subsequent received pulse by the transceiver, the subsequent received pulse which includes the subsequent transmitted pulse backscattered from the ground; encoding by the data processor the subsequent received pulse to generate a further subsequent transmitted pulse; and transmitting by the transceiver the further subsequent transmitted pulse to the ground.

The method of operation of a SAR may be summarized as further including: transmitting by the transceiver a second transmitted pulse to the ground before transmitting by the transceiver the subsequent transmitted pulse to the ground, wherein the transmitting of the subsequent transmitted pulse does not consecutively follow the transmitting of the first transmitted pulse.

A method of generating by a ground terminal a synthetic aperture radar (SAR) image of the ground, the ground terminal comprising a transceiver, a data store, and a hardware data processor, may be summarized as including: receiving by the transceiver an interrogation pulse transmitted by a SAR; transmitting by the transceiver a response to the interrogation pulse; transmitting by the transceiver position information specifying a ground location; receiving by the transceiver an $n^{th}$ transmitted pulse transmitted by the SAR; storing the $n^{th}$ transmitted pulse in the data store; receiving by the transceiver an $m^{th}$ transmitted pulse transmitted by the SAR, wherein m is greater than n, and wherein a radar return received by the SAR includes the $n^{th}$ transmitted pulse backscattered to the SAR from the ground, and the $m^{th}$ transmitted pulse transmitted by the SAR includes an encoding of the radar return received by the SAR; storing the $m^{th}$ transmitted pulse in the data store; decoding by the data processor the $m^{th}$ transmitted pulse to regenerate the radar return received by the SAR; and generating a range line by the data processor for the SAR image of the ground by range compression of the radar return received by the SAR using the $n^{th}$ transmitted pulse as a reference function.

In some implementations, the first and the subsequent transmitted pulses are consecutive pulses. In other implementations, the first and the subsequent transmitted pulses are successive pulses but not consecutively successive pulses, and there is at least one intervening transmitted pulse between the first and the subsequent transmitted pulses.

Decoding by the data processor the $m^{th}$ transmitted pulse to regenerate the radar return received by the SAR may include: convolutionally decoding by the data processor the $m^{th}$ transmitted pulse to generate a modulated radar return; and demodulating by the data processor the modulated radar return to regenerate the radar return received by the SAR.

Encoding of the $m^{th}$ transmitted pulse may include an encryption of the radar return received by the SAR, and decoding the $m^{th}$ transmitted pulse by the data processor to regenerate the radar return received by the SAR may include: decrypting by the data processor the $m^{th}$ transmitted pulse to generate an encoded radar return; convolutionally decoding by the data processor the encoded radar return to generate a modulated radar return; and demodulating by the data processor the modulated radar return to regenerate the radar return received by the SAR.

In any of the above described implementations of the method of generating by a ground terminal a synthetic aperture radar (SAR) image of the ground, transmitting by the transceiver position information specifying a ground location may include transmitting by the transceiver position information that includes the ground location of the ground terminal. Transmitting by the transceiver position information specifying a ground location may include transmitting by the transceiver position information that includes the center of a desired image ground area.

A synthetic aperture radar (SAR) imaging system may be summarized as including: a SAR mounted on a SAR platform, the SAR selectively operable in an interrogation mode to transmit a plurality of interrogation pulses to the ground; a ground terminal comprising a ground terminal antenna communicatively coupled to a transceiver, the transceiver communicatively coupled to at least one of a ground terminal data store and a ground terminal data processor, wherein the ground terminal is selectively operable to receive an interrogation pulse and respond by transmitting position information specifying a ground location to the SAR, and wherein the SAR imaging system, in response to receiving position information from the ground terminal, generates a SAR image of the ground that includes the ground location specified in the position information received in response to the interrogation pulse.

The SAR platform may be selected from a group consisting of a spaceborne platform and an airborne platform. The SAR may include: a SAR antenna that in a self-imaging mode of operation transmits a plurality of transmitted pulses to the ground that includes a first and a subsequent transmitted pulse, and receives a plurality of received returns backscattered from the ground that includes a first and a subsequent received return; a SAR transceiver communicatively coupled to the SAR antenna, the SAR transceiver communicatively coupled to at least one of a SAR data store and a SAR data processor, the SAR data store communicatively coupled to the SAR data processor, the SAR data store which stores the first received return, and the SAR data processor which encodes the first received return to generate the subsequent transmitted pulse for transmission by the SAR antenna to the ground. The ground terminal transceiver may be selectively operable to receive the subsequent transmitted pulse, and the ground terminal data processor may decode the subsequent transmitted pulse to regenerate the first received return, retrieve a reference function from the ground terminal data store, and generate a range line by range compression of the first received return using the reference function. The reference function may be, at least in part, derived from the first transmitted pulse. The SAR data processor may include: at least one of a phase-shift keying (PSK) modulator or an amplitude and phase-shift keying (APSK) modulator which in operation generates a modulated first received return from the first received return; and a convolutional encoder which in operation generates an encoded first received return from the modulated first received return. The SAR data processor may further include an encrypter which encrypts the encoded first received return. The ground terminal data processor may include: a convolutional decoder which decodes the subsequent transmitted pulse; at least one of a phase-shift keying (PSK) demodulator or an amplitude and phase-shift keying (APSK) demodulator which in operation regenerates the first received return from the decoded subsequent transmitted pulse.

In any of the above described implementations of the SAR imaging system, the SAR may be selectively operable in a broad-beam mode, and the plurality of interrogation pulses may be transmitted while the SAR is operating in the broad-beam mode. The plurality of interrogation pulses may be transmitted at a pulse repetition frequency in a range of 0.5 Hz to 50 Hz.

A method of operation of a radar comprising a transmitter, a receiver, and a set of processor circuitry, may be summarized as including: transmitting by the transmitter a first pulse; receiving by the receiver a radar return that includes the first pulse returned from a target; encoding by the set of processor circuitry the radar return to generate a subsequent pulse; and transmitting by the transmitter the subsequent pulse.

In some implementations, the first and the subsequent pulses are consecutive pulses transmitted by the transmitter. In other implementations, the first and the subsequent pulses are not consecutive pulses, and there is at least one intervening transmitted pulse between the first and the subsequent pulses.

Receiving by the receiver a radar return that includes the first pulse returned from a target may include receiving by the receiver a radar return that includes the first pulse backscattered from a target on a surface of the Earth. The radar may be operable to image the target on the surface of the Earth from at least one of an airborne platform or a spaceborne platform. The radar may include a transceiver that includes the transmitter and the receiver.

Encoding the radar return by the set of processor circuitry to generate a subsequent pulse may include: sampling the radar return to generate a sampled radar return; modulating by the set of processor circuitry the sampled radar return by at least one of phase-shift keying (PSK) or amplitude and phase-shift keying (APSK) to generate a modulated radar return; and convolutionally encoding by the set of processor circuitry the modulated radar return to generate an encoded radar return. Encoding the radar return by the processor circuitry to generate a subsequent pulse further may include encrypting by the set of processor circuitry the encoded radar return to generate an encrypted subsequent pulse.

A method of operation of a synthetic aperture radar comprising a transmitter, a receiver, and a set of processor circuitry may be summarized as including: transmitting by the transmitter a first pulse; receiving by the receiver a radar return that includes the first pulse returned from a target; encoding by the set of processor circuitry the radar return to generate a subsequent pulse; and transmitting by the transmitter the subsequent pulse.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

The technology described in this application is a SAR mode for applications requiring real-time or near real-time situational awareness on demand, such as search and rescue. It is particularly suitable for circumstances where a person in the field needs to know what is in the immediate vicinity, say, in a local 5 km to 10 km square area. The technology is suitable for a SAR imaging system mounted on a spacecraft, an aircraft or a drone, for example. The person in the field requires a ground terminal for receiving signals from the SAR and for transmitting signals to the SAR.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The Abstract of the Disclosure and headings provided herein are for convenience only and do not interpret the scope or meaning of the embodiments.

Figure 1A:
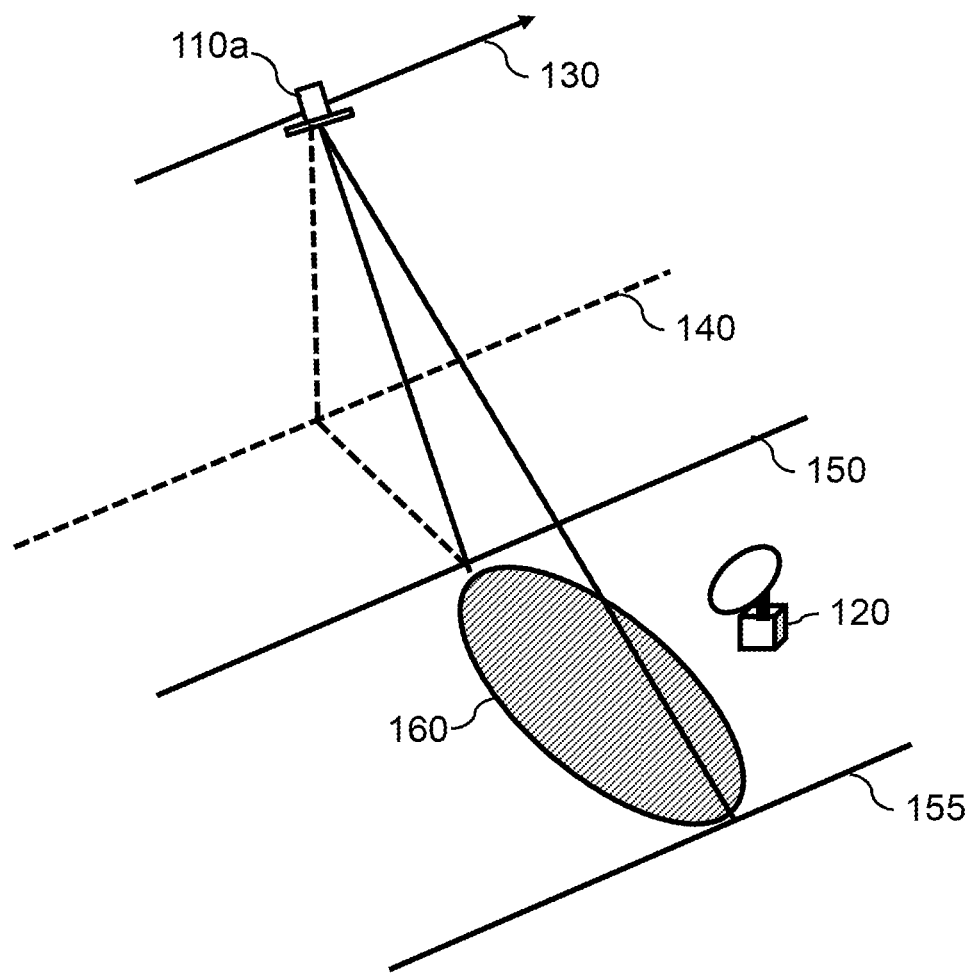
FIG. 1A is a schematic diagram illustrating the illumination geometry of an example embodiment of a SAR imaging system in accordance with the present systems, devices, methods, and articles.

FIG. 1A is a schematic diagram illustrating the illumination geometry of an example embodiment of a SAR imaging system in accordance with the present systems, devices, methods, and articles. The SAR imaging system of FIG. 1A comprises a spaceborne platform 110a and a ground terminal 120. Spaceborne platform 110a comprises a synthetic aperture radar (not shown in FIG. 1A). The elements of the synthetic aperture radar (SAR) are described in reference to FIG. 2 (below).

Spaceborne platform 110a can be, for example, a satellite, a spacecraft, or a space station. In some implementations, spaceborne platform 110a can be replaced by an aircraft or an unmanned aircraft such as a drone, for example (see FIG. 1B). In some implementations, ground terminal 120 is mobile. In other implementations, ground terminal 120 is fixed. In some implementations, ground terminal 120 is man-portable.

Spaceborne platform 110a flies along trajectory 130. Dashed line 140 indicates the ground track of spaceborne platform 110a. Line 150 and line 155 indicate the near-side and the far-side of a swath, respectively. Shaded region 160 represents a main lobe of an SAR antenna beam pattern on the ground. As spaceborne platform 110a flies along trajectory 130, ground terminal 120 will first enter and then leave the SAR antenna beam, as represented by shaded region 160.

Figure 1B:
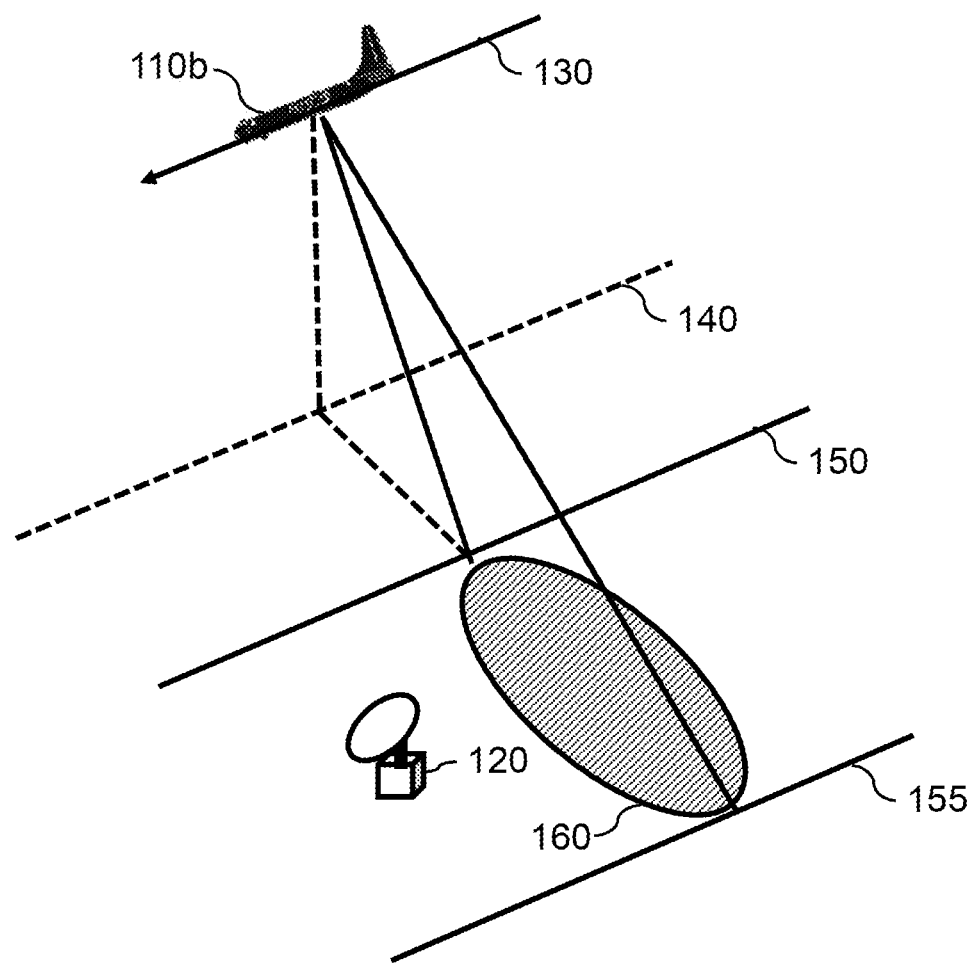
FIG. 1B is a schematic diagram illustrating the illumination geometry of another example embodiment of a SAR imaging system in accordance with the present systems, devices, methods, and articles.

FIG. 1B is a schematic diagram illustrating the illumination geometry of another example embodiment of a SAR imaging system in accordance with the present systems, devices, methods, and articles using an airborne platform 110b instead of spaceborne platform 110a. Airborne platform 110b can be, for example, an aircraft, an unmanned aircraft, or a drone.

Figure 2:
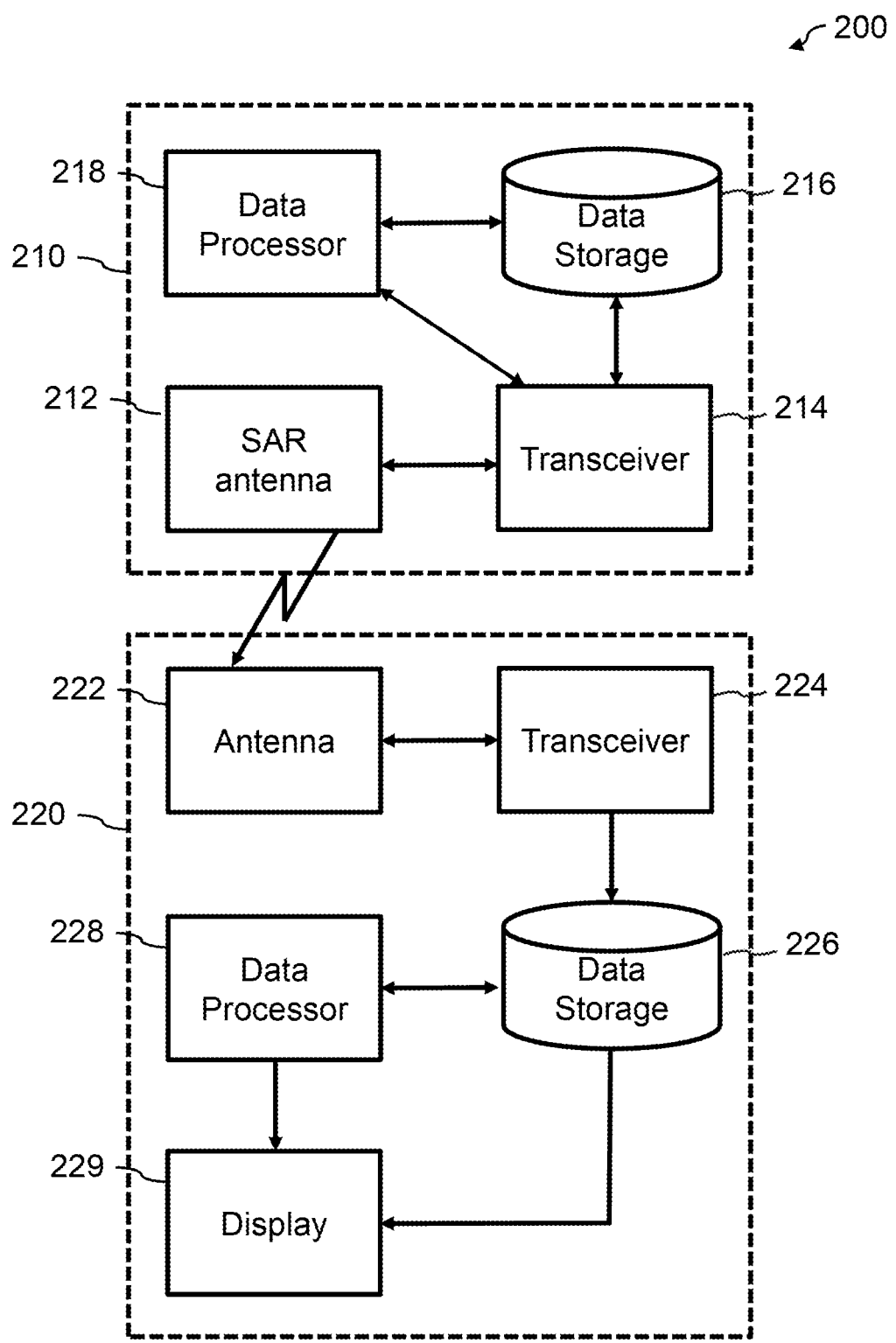
FIG. 2 is a block diagram illustrating an example embodiment of a SAR imaging system in accordance with the present systems, devices, methods, and articles.

FIG. 2 is a block diagram illustrating an example embodiment of SAR imaging system 200 in accordance with the present systems, devices, methods, and articles. SAR imaging system 200 comprises synthetic aperture radar (SAR) 210 and ground terminal 220. SAR 210 can be mounted on an airborne or spaceborne SAR platform such as an aircraft, drone, satellite or space station. SAR 210 can be flown on a satellite such as spaceborne platform 110a of FIG. 1A.

SAR 210 comprises one or more antenna 212, transceiver 214, nontransitory SAR data storage media 216, and SAR data processor 218 (e.g., hardware circuitry). Antenna 212 is bi-directionally communicatively coupled to transceiver 214. Transceiver 214 is bi-directionally communicatively coupled to data storage 216 and data processor 218. Data storage 216 is bi-directionally communicatively coupled to data processor 218.

Data storage 216 can take the form of one or more computer- or processor-readable memories or storage media, for instance volatile memory (e.g., RAM), nonvolatile memory (e.g., ROM, FLASH, EEPROM), or spinning media (e.g., magnetic disk, optical disk) with associated readers and/or writers.

Data processor 218 can comprise one or more data processing elements such as a modulator, an encoder, an encrypter and the like. Data processor 218 can also comprise one or more control elements such as a controller to determine when to switch modes of operation, to command the SAR to switch operation and to synchronize operations in each mode.

Data processor 218 can take the form of one or more circuits or circuitry or hardware, for instance one or more microprocessors (single or multicore), central processor units (CPUs), digital signal processors (DSPs), graphic processing units (GPUs), application specific integrated circuits (ASICs), programmable gate arrays (PGAs), or programmable logic units (PLUs).

Ground terminal 220 comprises antenna 222, transceiver 224, terminal data storage 226, terminal data processor 218, and terminal display 219. Antenna 222 is bi-directionally communicatively coupled to transceiver 224, and transceiver 224 is communicatively coupled to data storage 226. Data received at antenna 222 can be communicated to transceiver 224, and stored in data storage 226. Transceiver 224 can transmit data via antenna 222. Data storage 226 is bi-directionally communicatively coupled to data processor 228. Display 229 can receive data for display from data storage 226 and data processor 228.

Data storage 226 can take the form of one or more computer- or processor-readable memories or storage media, for instance volatile memory (e.g., RAM), nonvolatile memory (e.g., ROM, FLASH, EEPROM), or spinning media (e.g., magnetic disk, optical disk) with associated readers and/or writers. Data processor 228 can take the form of one or more circuits or circuitry or hardware, for instance one or more microprocessors (single or multicore), central processor units (CPUs), digital signal processors (DSPs), graphic processing units (GPUs), application specific integrated circuits (ASICs), programmable gate arrays (PGAs), or programmable logic units (PLUs).

In some implementations, SAR 210 has a sufficiently large transmit power that antenna 222 of ground terminal 220 can be relatively small. For example, antenna 222 of ground terminal 220 can be small enough that ground terminal 220 is man-portable, and consequently easily deployed, such as in search and rescue operations. Terminal data processor 218 typically has sufficient processing power to generate SAR images by SAR data processing in near real-time, for example within an hour of reception of the raw data by ground terminal 220.

Figure 3:
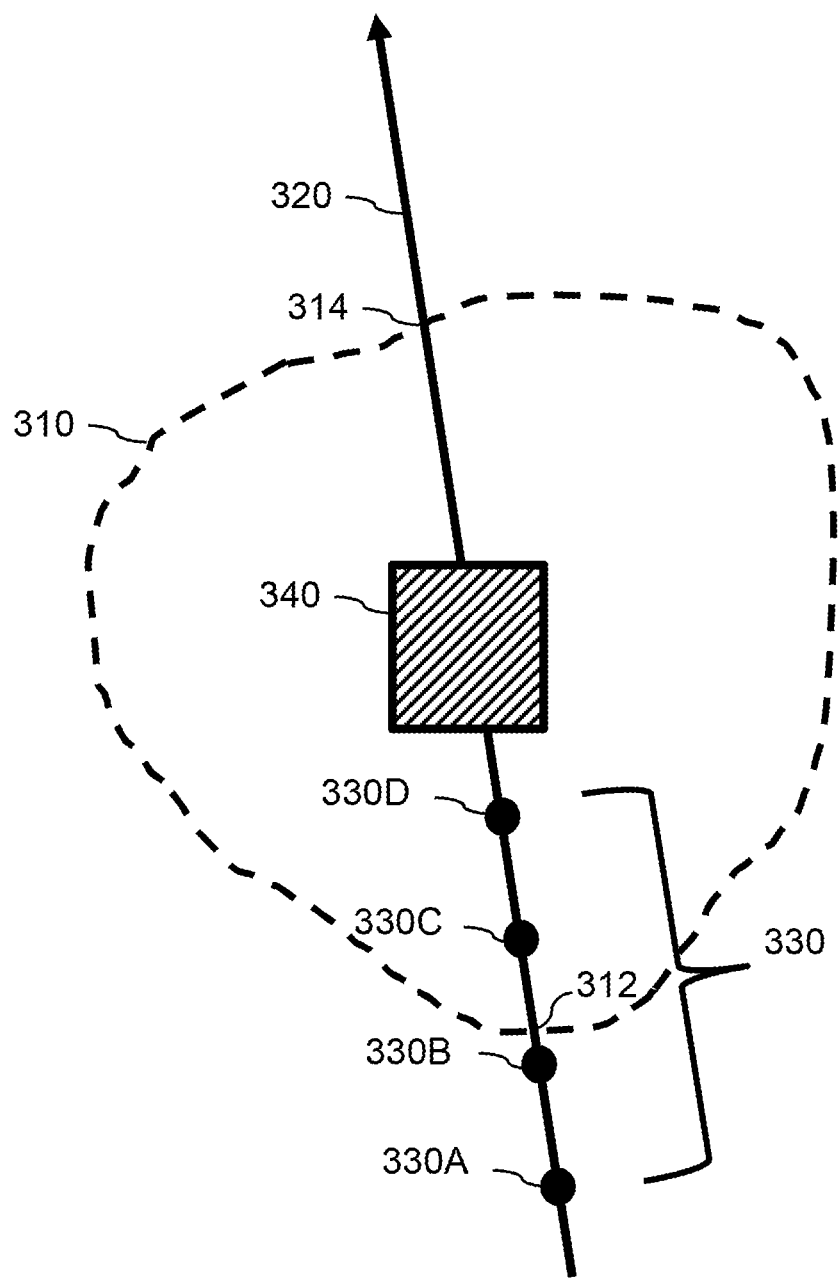
FIG. 3 is a schematic diagram illustrating operation of an example embodiment of a SAR imaging system in accordance with the present systems, devices, methods, and articles.

FIG. 3 illustrates operation of an example embodiment of a SAR imaging system in accordance with the present systems, devices, methods, and articles. The SAR imaging system comprises a SAR and a ground terminal (such as SAR 210 and ground terminal 220 of FIG. 2). The SAR platform (not shown in FIG. 3) overflies region of interest (enclosed by broken line 310), and beam ground track 320 intersects region of interest 310. Beam ground track 320 enters region of interest 310 at position 312, and leaves region of interest 310 at position 314.

The SAR imaging system transmits interrogation pulses at periodic intervals when the SAR imaging system is at various positions 330A, 330B, 330C, and 330D (collectively 330) in its transit, before and during its overflight of region of interest 310. The interrogation pulses can be generated using a broad-beam mode of the SAR imaging system.

In an example implementation, the SAR transmits pulses at a low pulse repetition frequency in the range 0.5 Hz to 50 Hz (e.g., 20 Hz) when in the broad-beam mode. Each pulse is an indication to the ground terminal, or to a user on the ground, that the SAR is approaching, and ready to be commanded into a self-imaging mode by the ground terminal. The SAR antenna beam in the broad-beam mode can be generated, for example, by decreasing the active antenna area, or by beam shaping, either in range or azimuth, or both.

A ground terminal (not shown in FIG. 3) can receive an interrogation pulse transmitted in the broad-beam mode. The ground terminal can respond by firstly acknowledging receipt of the interrogation pulse, and then transmitting a set of coordinates to the SAR corresponding to a center of a desired image ground area 340. In some examples, the set of coordinates include the latitude and the longitude of the center of desired image ground area 340. In some examples, the center of desired image ground area 340 is coincident with the location of the ground terminal. In other examples, the center of desired image ground area 340 is selected such that the ground terminal and the desired image ground area are both within the SAR imaging beam.

In an example implementation, the SAR transmits at L-band ($\lambda=24$ cm) and has along-track antenna dimension D=6 m. In this example, the broad-beam mode of the SAR transmits a beam having a cross-track beamwidth (defined as the angle of the half-power points of the main lobe) of $\theta_{CT}=20°$, and an along-track beamwidth $\lambda/D$ of $\theta_{AT}=2.3°$. At a range of approximately 450 km, the along-track beamwidth on the ground is approximately 18 km.

The pulses transmitted by the SAR in the broad-beam mode can be narrow-band pulses, selected so that there is sufficient link margin for the ground terminal (such as ground terminal 220 of FIG. 2) to receive the pulses. The ground terminal can receive an interrogation pulse via a sidelobe of the SAR beam, for example the first sidelobe or the second sidelobe of the SAR beam. The first and the second sidelobes of the antenna pattern of the SAR beam are typically approximately 13 dB and 28 dB below the mainlobe, respectively. In an example implementation, the ground terminal receives one of the interrogation pulses via the first sidelobe of the SAR beam, providing approximately 2.5 seconds before the satellite is able to image desired image ground area 340, such as a region centered on the ground terminal's coordinates.

Upon receiving the set of coordinates from the ground terminal, the SAR switches to a narrow-beam mode (the narrow-beam mode having a beamwidth narrower than the broad-beam mode), and starts data transmission and collection for imaging.

Figure 4:
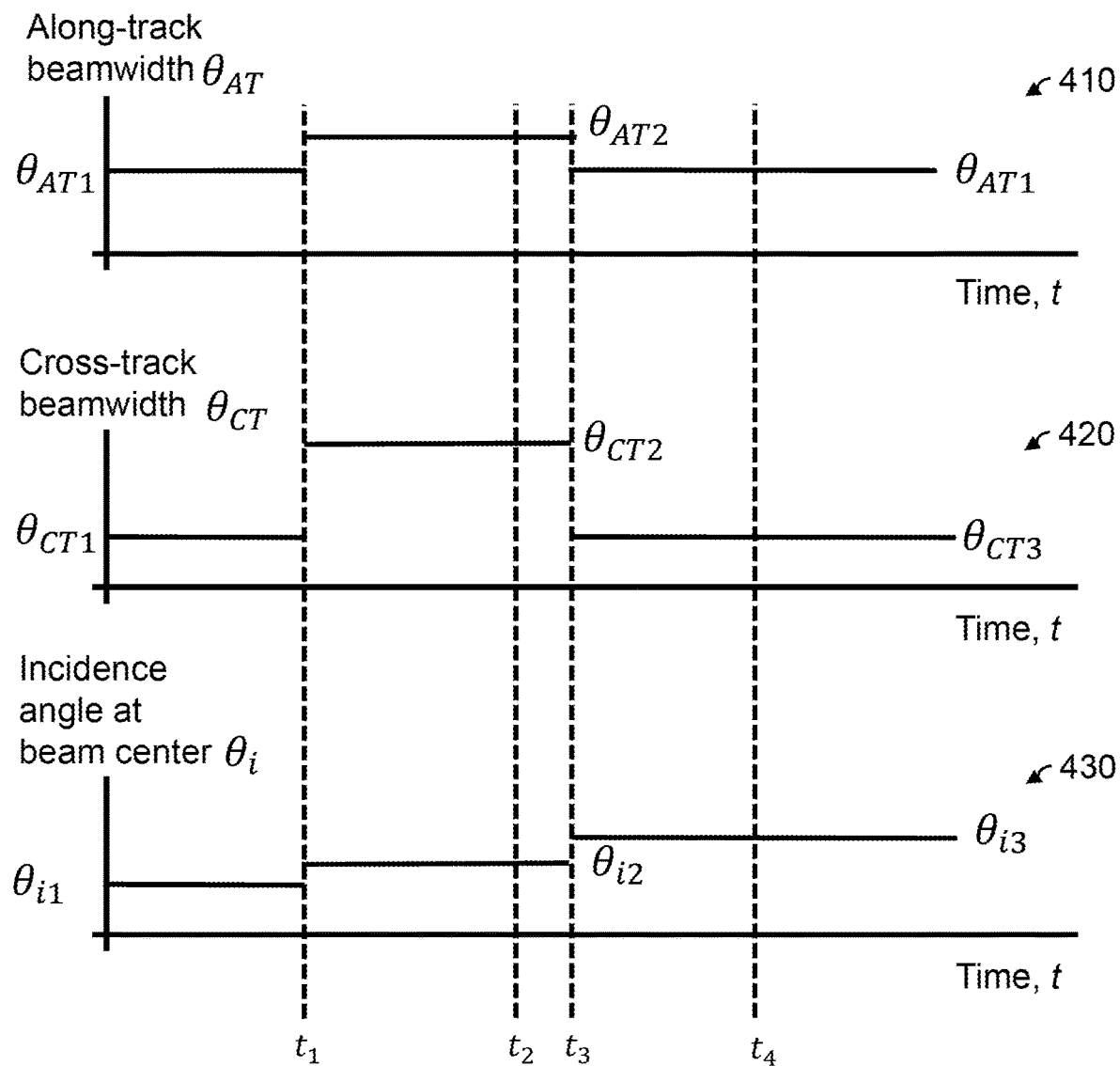
FIG. 4 is a timing diagram illustrating an example timing sequence for operation of a SAR imaging system in accordance with the present systems, devices, methods, and articles.

FIG. 4 is a timing diagram illustrated an example timing sequence for operation of a SAR imaging system in accordance with the present systems, devices, methods, and articles. FIG. 4 shows three synchronized timing graphs 410, 420, and 430. Graph 410 shows a plot of along-track beamwidth $\theta_{AT}$ as a function of time t. Graph 420 shows a plot of cross-track beamwidth $\theta_{CT}$ as a function of time t. Graph 430 shows a plot of incidence angle of the beam center $\theta_i$ as a function of time t. The incidence angle of the beam center $\theta_i$ is related to the cross-track position of the beam center on the ground.

At time $t_1$, the SAR imaging system switches to an interrogation mode and starts to transmit interrogation pulses (such as pulses 330 of FIG. 3). In some implementations, along-track beamwidth $\theta_{AT}$ is unchanged, and has a value of $\theta_{AT1}$ both before and after time $t_1$. In other implementations, along-track beamwidth $\theta_{AT}$ can be broadened and (optionally) steered, and changes value from $\theta_{AT1}$ to $\theta_{AT2}$ at time $t_1$.

Cross-track beamwidth $\theta_{CT}$ undergoes a stepwise increase as the SAR imaging system changes from a narrow-beam mode to a broad-beam mode. At time $t_1$, cross-track beamwidth $\theta_{CT}$ changes from a value of $\theta_{CT1}$ to a value of $\theta_{CT2}$.

At time $t_1$, incidence angle of the beam center $\theta_i$ can change from a value of $\theta_{i1}$ to a value of $\theta_{i2}$.

At time $t_2$, the SAR imaging system receives a response from the ground terminal. The along-track and cross-track beamwidths, and the incidence angle of the beam center remain unchanged.

At time $t_3$, the SAR imaging system receives the coordinates from the ground terminal and switches to a self-imaging mode. Along-track beamwidth $\theta_{AT}$ may change from $\theta_{AT2}$ to $\theta_{AT3}$ at time $t_3$. In some examples, $\theta_{AT3}$ can be the same as $\theta_{AT1}$.

Cross-track beamwidth $\theta_{CT}$ undergoes a stepwise decrease as the SAR imaging system changes from a broad-beam mode to a narrow-beam imaging mode. At time $t_3$, cross-track beamwidth $\theta_{CT}$ changes from a value of $\theta_{CT2}$ to a value of $\theta_{CT3}$.

At time $t_3$, incidence angle of the beam center $\theta_i$ can change from a value of $\theta_{i2}$ to a value of $\theta_{i3}$ that accommodates the coordinates of the ground terminal and the desired image ground area. Incidence angles of the beam center $\theta_{i1}$, $\theta_{i2}$, and $\theta_{i3}$ are incidence angles within the incidence angle capability of the SAR.

At time $t_4$, the SAR imaging system begins imaging of the desired image ground area, centered on the coordinates provided by the ground terminal.

In an example implementation, values of along-track beamwidth, cross-track beamwidth, and incidence angle at beam center are as follows:

$\theta_{AT1}=2.3°$, $\theta_{AT2}=2.3°$ $\theta_{CT1}=8°$, $\theta_{CT2}=20°$, $\theta_{CT3}=8°$ $\theta_{i1}=25°$, $\theta_{i2}=30°$, $\theta_{i3}=35°$ The first transmitted pulse in the narrow-beam mode is a linear FM chirp. The ground terminal receives and stores the transmitted pulse for use as a reference function.

The transmitted pulse is backscattered and received at the SAR. The SAR digitizes the received pulse, encodes it, and (optionally) encrypts it. The received data is used as the next transmitted pulse. It is noise-like, and has a desirable auto-correlation function.

The ground terminal receives the second transmitted pulse, which is the encrypted encoded return from the first pulse. The ground terminal decrypts the second transmitted pulse, decodes the decrypted second transmitted pulse, and processes the decoded and decrypted second transmitted pulse with the linear FM reference pulse that was captured from the first transmission. The ground terminal now has the first range line of a SAR image, and the reference function for the next range line, where the reference function for the next range line is derived from the second transmitted pulse.

The second transmitted pulse (the encrypted encoded return from the first transmitted pulse) is backscattered and received at the SAR. As before, the SAR digitizes the second transmitted pulse, encodes the second transmitted pulse, and (optionally) encrypts the encoded second transmitted pulse. Then the SAR uses the new "data" as the next transmit pulse. It too is noise-like, and has a desirable autocorrelation function.

The ground terminal receives the encrypted encoded return from the second pulse, decrypts the encrypted encoded return, decodes it, and processes it with the encrypted transmission that was captured from the second transmission. The ground terminal now has the second range line as well as the reference function for the next range line derived from the third transmitted pulse. This process is repeated for all the range lines needed to form the SAR image.

More detail is provided with reference to FIGS. 5 to 11.

Figure 5:
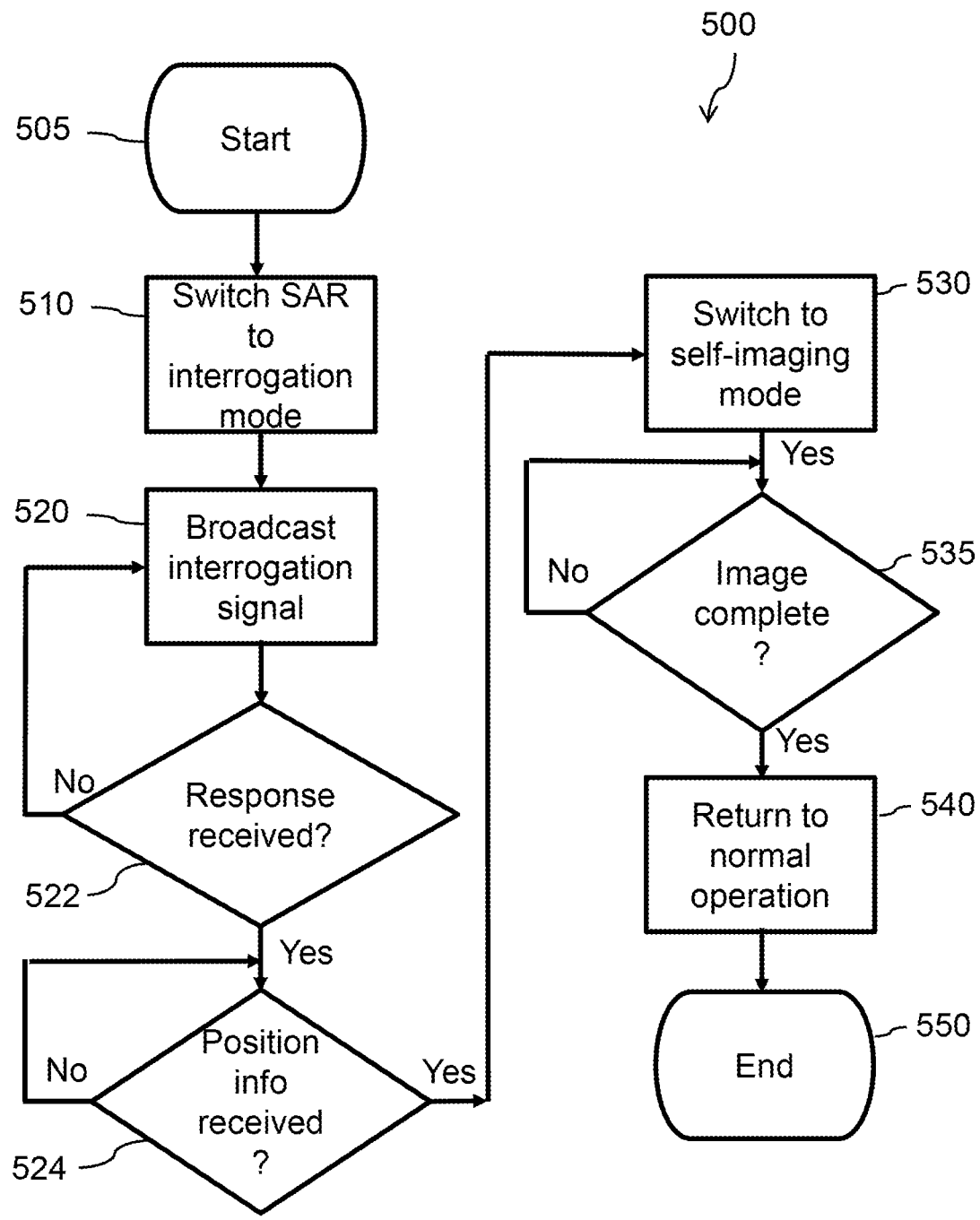
FIG. 5 is a flow chart illustrating a method of operation of a SAR imaging system in accordance with the present systems, devices, methods, and articles.

FIG. 5 is a flow chart illustrating a method of operation 500 of a SAR imaging system in accordance with the present systems, devices, methods, and articles. Method 500 begins at 505 for example in response to a request from an operator input or in response to a command from another system.

At 510, the SAR imaging system switches to an interrogation mode, and, at 520, broadcasts an interrogation signal. In some implementations, the interrogation signal can be a sequence of interrogation pulses (such as pulses 330 of FIG. 3). For example, the interrogation signal can be a sequence of pulses generated in a broad-beam mode of the SAR and transmitted at a PRF of 20 Hz.

At 522, the SAR imaging system determines if a response to the interrogation signal from a ground terminal has been received. In response to determining that a response to the interrogation signal has been received (YES) at 522, control in method 500 proceeds to 524. In response to determining that a response to the interrogation signal has not been received (NO) at 522, control in method 500 returns to 520. The loop defined by 520 and 522 causes method 500 to wait until a response from a ground terminal to an interrogation signal from the SAR has been received at the SAR, or until the SAR imaging system exits the interrogation mode, for example upon satisfying a timeout condition.

At 524, the SAR imaging system determines if position information from the corresponding ground terminal, such as the center of the desired image ground area, has been received. In response to determining that position information has been received (YES) at 524, control in method 500 proceeds to 530. In response to determining that position information has not been received (NO) at 524, control in method 500 returns to 524. The loop defined by 524 causes method 500 to wait until position information for the responding ground terminal has been received, or until the SAR imaging system exits the interrogation mode, for example upon satisfying a timeout condition.

At 530, the SAR imaging system switches to a self-imaging mode and initiates generation of a self-image. At 535, the SAR imaging system determines the self-image is complete. In response to determining that the image is complete (YES) at 535, control in method 500 proceeds to 540. In response to determining that the image is not complete (NO) at 535, control in method 500 returns to 535. The loop defined by 535 causes method 500 to wait until the self-image is complete, or until the SAR imaging system terminates the generation of the self-image, for example upon satisfying a timeout condition and/or exiting the self-imaging mode.

At 540, the SAR imaging system switches to a normal mode of operation or back to interrogation mode, depending on the SAR imaging system's tasking plan, or in response to a request from an operator or a command from another system, and method 500 terminates at 550, for example until called or invoked again.

Figure 6:
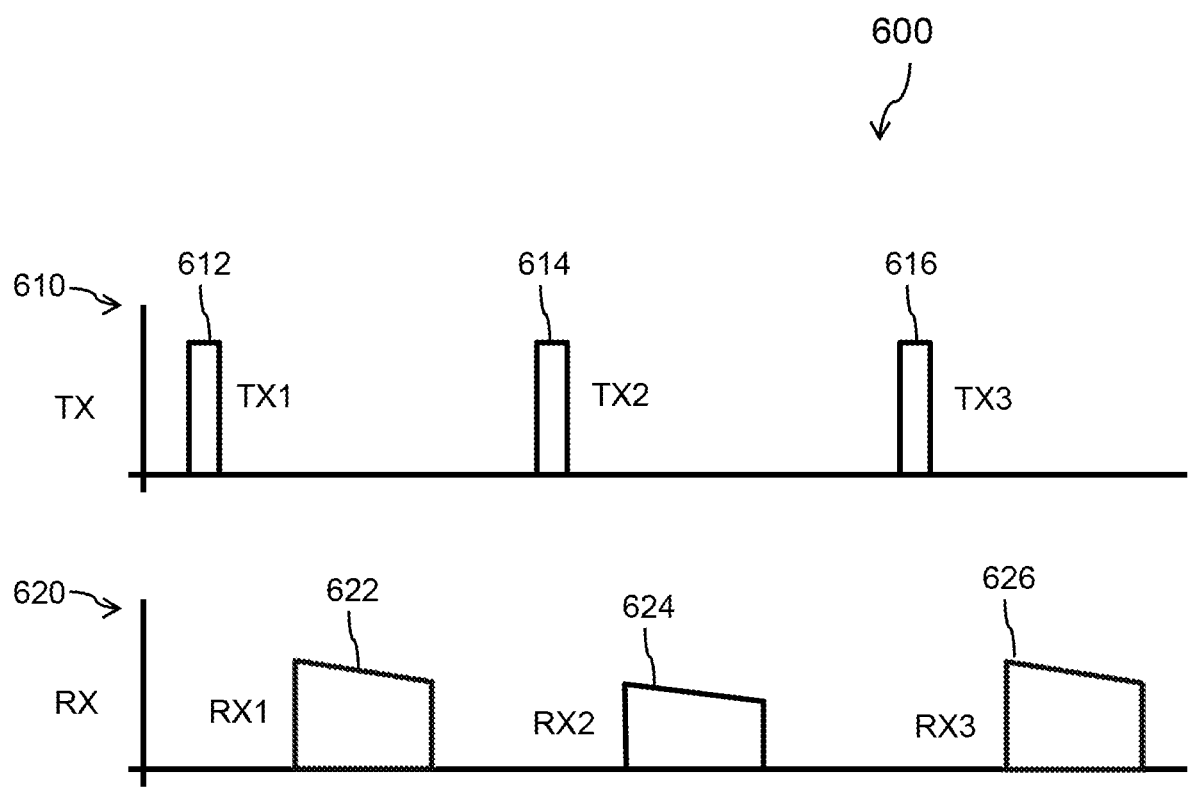
FIG. 6 is a timing diagram illustrating an example timing sequence for transmitted and received pulses during operation of a SAR imaging system in accordance with the present systems, devices, methods, and articles.

FIG. 6 is a timing diagram illustrating an example timing sequence 600 for transmitted and received pulses during operation of a SAR imaging system in accordance with the present systems, devices, methods, and articles. Timing sequence 600 comprises transmit (TX) timing sequence 610, and receive (RX) timing sequence 620.

FIG. 6 illustrates a sequence of three transmitted pulses 612, 614, and 616, and three corresponding received pulses 622, 624, and 626. In operation, the SAR imaging system can transmit and receive any suitable number of pulses. In some implementations, one or more of the transmitted pulses 612, 614, 616, etc. are linear frequency-modulated (FM) pulses. Each received pulse (622, 624, 626, etc.) is a superposition of reflections of a corresponding transmitted pulse (612, 614, 616, etc. respectively). The reflections are from targets on the ground. Received pulses 622, 624, 626, etc. are typically noise-like.

Figure 7:
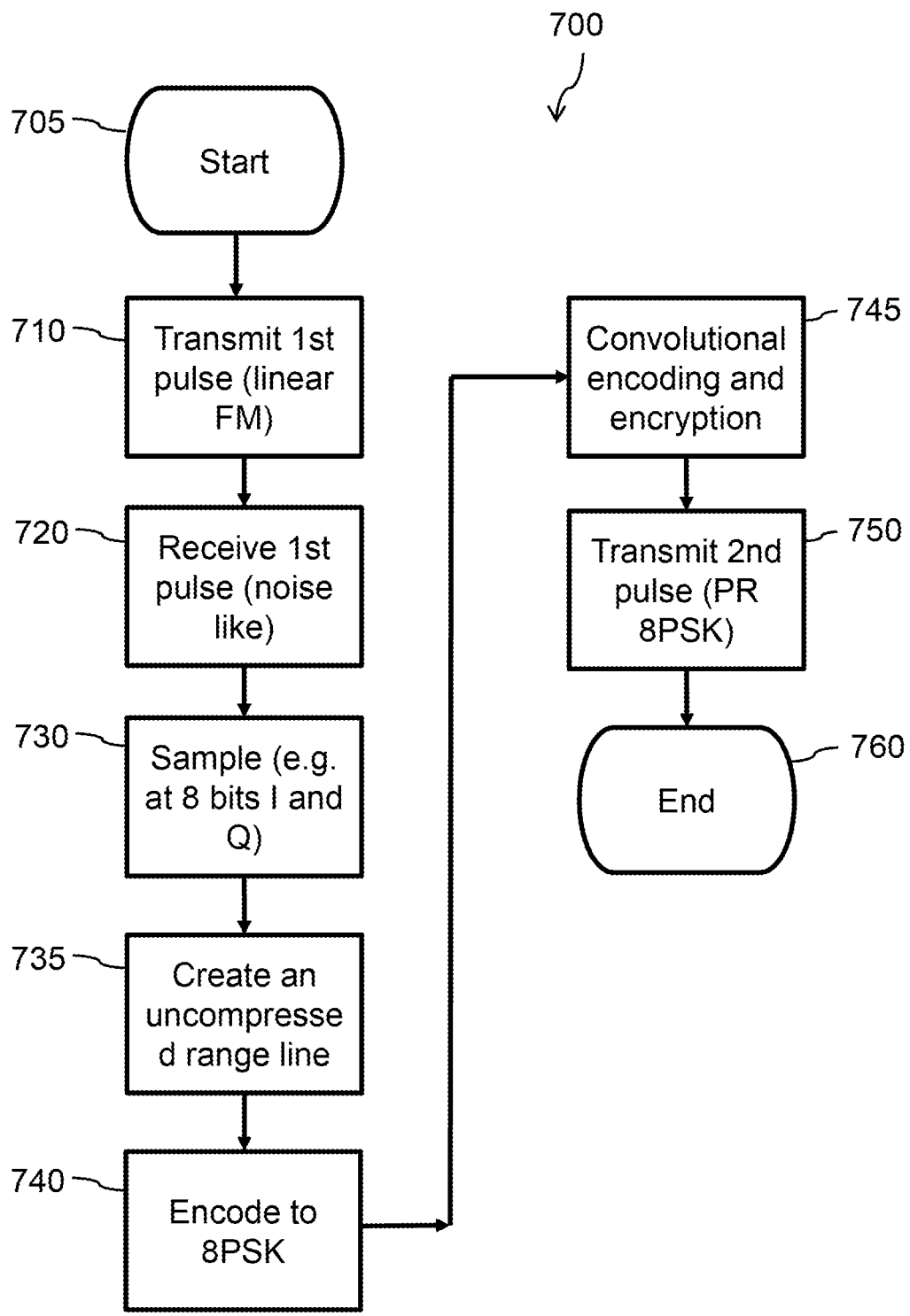
FIG. 7 is a flow chart illustrating an example method of encoding a transmitted pulse of a SAR imaging system in accordance with the present systems, devices, methods, and articles.

FIG. 7 is a flow chart illustrating an example method 700 of encoding a transmitted pulse of a SAR imaging system in accordance with the present systems, devices, methods, and articles. Method 700 begins at 705 for example in response to a request from an operator or in response to a command from another system.

At 710, the SAR imaging system transmits a first linear FM pulse (such as transmitted pulse 612 of FIG. 6), and, at 720, receives the first pulse (such as received pulse 622 of FIG. 6) reflected from the ground.

At 730, the SAR imaging system samples the first received pulse, for example to generate 8-bit in-phase (I) and quadrature (Q) samples, and, at 735, generates an uncompressed range line. The uncompressed range line can typically be a quasi-stationary Gaussian signal, for example where the pulse has been backscattered from a distributed target.

In a first encoding operation, at 740, the SAR imaging system encodes the data, for example to 8PSK (Phase-Shift Keying using 8 phases). PSK is a digital modulation technique in which a base signal is phase-modulated to represent the data. In a second encoding operation, at 745, the SAR imaging system convolutionally encodes and (optionally) encrypts the 8PSK-encoded data. Other encoding schemes can be used.

For example, 16PSK modulation can be used. The selected encoding scheme can depend, for example, on the size of the power of the SAR antenna and the antenna gain-to-noise-temperature (G/T) of the ground terminal antenna. A 16PSK scheme may be more suitable for a high power SAR transmitter and/or a high ground terminal antenna G/T. An 8PSK scheme may be more suitable for a lower power SAR transmitter and/or a lower ground terminal antenna G/T. If the transmitter has amplitude modulation capability, then the transmitted pulse can be encoded, at least in part, using amplitude modulation. Amplitude and phase-shift keying (APSK) can be used as a modulation scheme. In an example scheme, 8PSK is augmented by four additional vectors at half-amplitude at phase angles of 0°, 90°, 180°, and 270°.

The goal of encoding the data is usually to achieve a uniform power spectral density within the SAR operating bandwidth. A uniform power spectral density is typically associated with pseudo-random noise, which is desirable for the encoded data because the autocorrelation function (also known as the range point spread function) will be close to an ideal $\sin(x)/x$ curve for pseudo-random noise.

At 750, the SAR imaging system transmits the encoded first received pulse as a second transmitted pulse. Method 700 terminates at 760, for example until called or invoked again.

Figure 8:
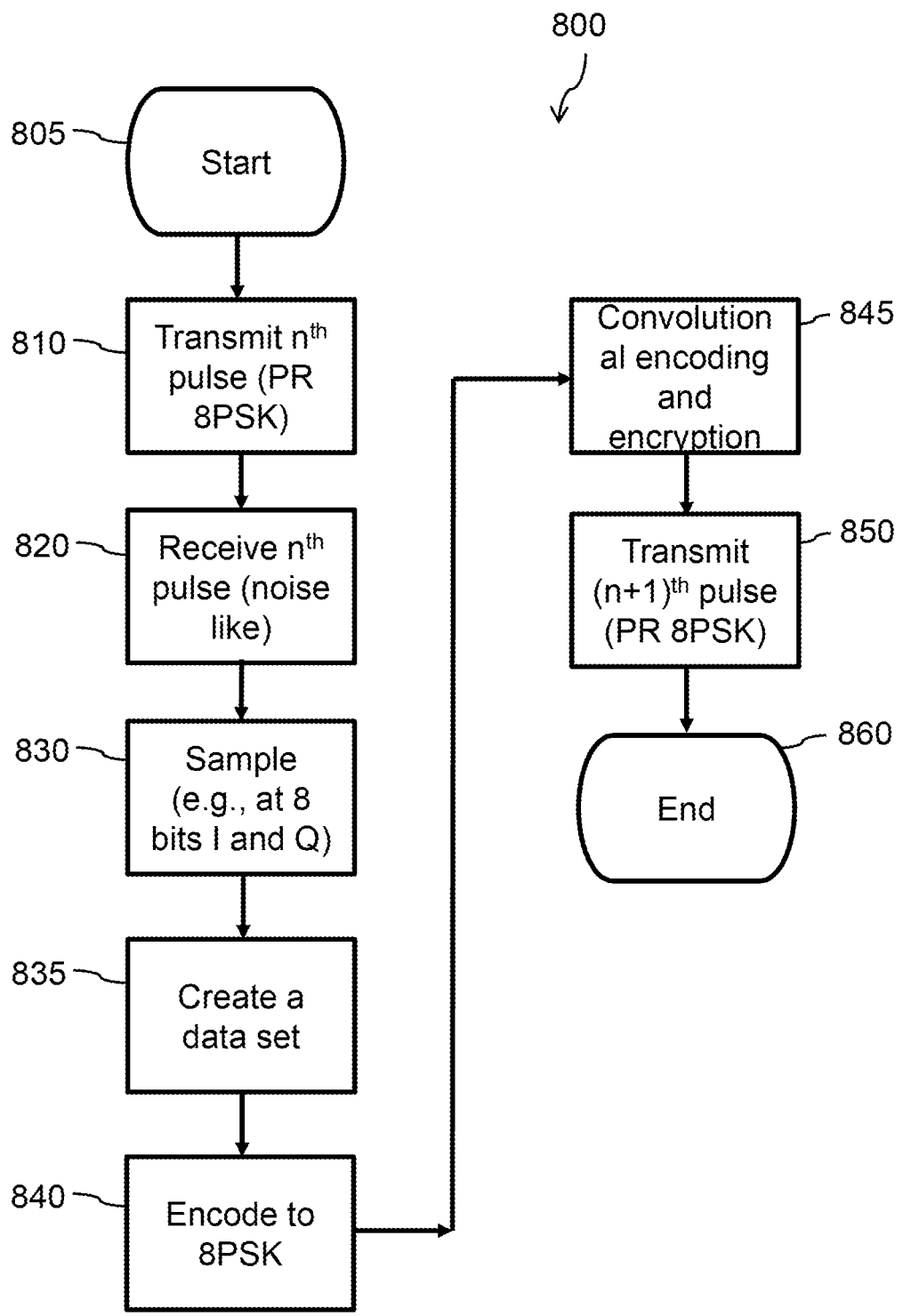
FIG. 8 is a flow chart illustrating another example method of encoding a transmitted pulse of a SAR imaging system in accordance with the present systems, devices, methods, and articles.

FIG. 8 is a flow chart illustrating another example method 800 of encoding a transmitted pulse of a SAR imaging system in accordance with the present systems, devices, methods, and articles. Method 800 begins at 805 for example in response to a request from an operator or in response to a command from another system.

At 810, the SAR imaging system transmits the $n^{th}$ pulse, for example using PR 8PSK encoding as described above, and, at 820, receives the $n^{th}$ pulse reflected from the ground.

At 830, the SAR imaging system samples the $n^{th}$ received pulse, for example to generate 8-bit in-phase (I) and quadrature (Q) samples, and, at 835, generates an uncompressed range line.

In a first encoding operation, at 840, the SAR imaging system encodes the data, for example to 8PSK (Phase-Shift Keying using 8 phases).

PSK is a digital modulation technique in which a base signal is phase-modulated to represent the data. In a second encoding operation, at 845, the SAR imaging system convolutionally encodes and (optionally) encrypts the 8PSK-encoded data.

At 850, the SAR imaging system transmits the encoded $n^{th}$ received pulse as the $n+1^{th}$ transmitted pulse. Method 800 terminates at 860, for example until called or invoked again.

Figure 9:
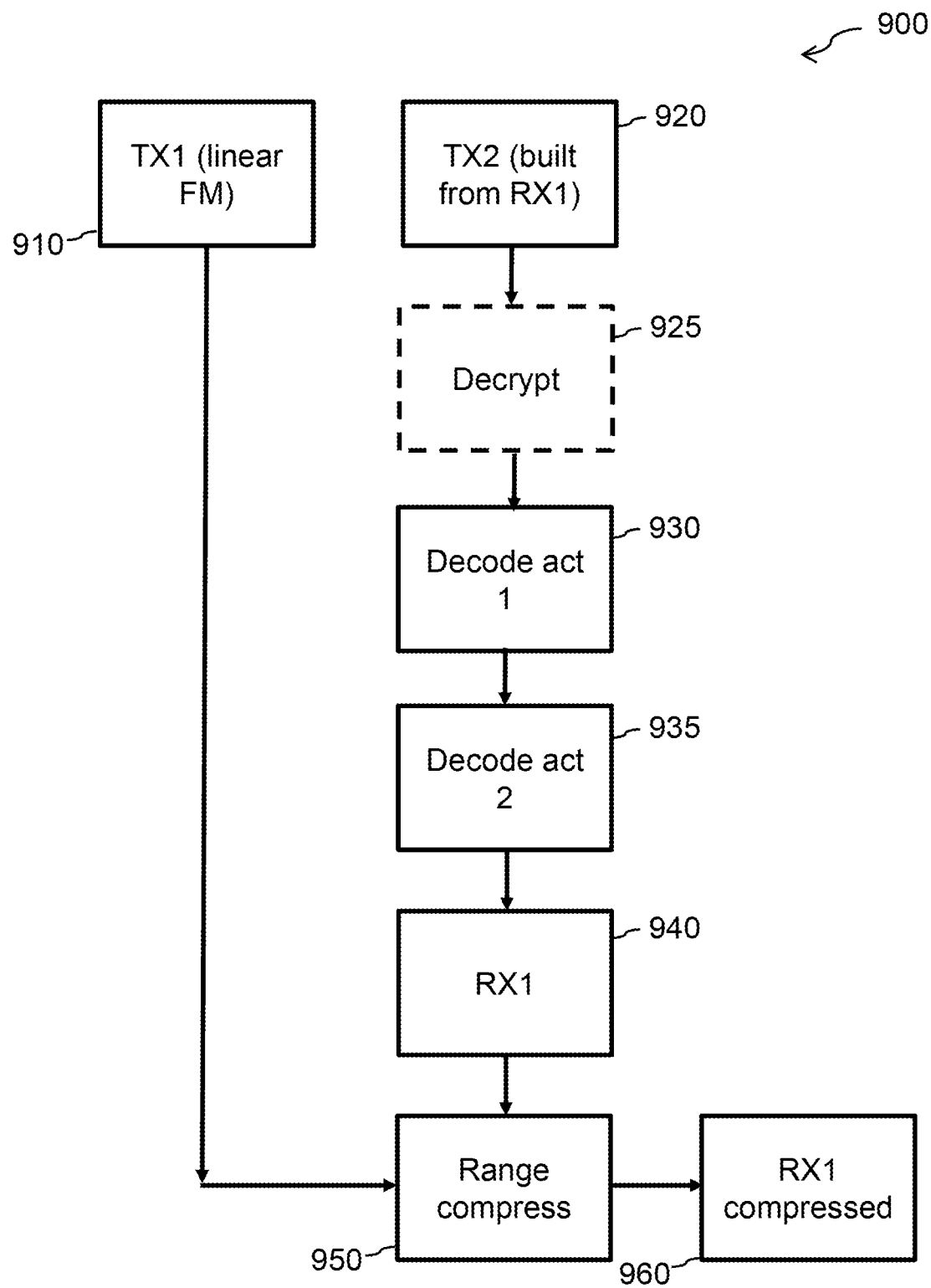
FIG. 9 is a flow chart illustrating a method of range compressing received pulses by a ground terminal in accordance with the present systems, devices, methods, and articles.

FIG. 9 is a flow chart illustrating a method 900 of range compressing received pulses by a ground terminal in accordance with the present systems, devices, methods, and articles.

At 910, the ground terminal retrieves a copy of TX1, the first transmitted pulse. In some implementations, as described above, TX1 is a linear FM pulse. At 920, the ground terminal retrieves a copy of TX2, the second transmitted pulse built from the first received pulse RX1 (see for example FIG. 6).

At 930 and 935, the ground terminal decodes and demodulates TX2 in a first and a second act, respectively. The first act can include decryption and decoding, and the second act can include demodulation. At 940, the ground terminal regenerates RX1, the first received pulse, and, at 950, the ground terminal performs range compression using TX1 and RX1, the replica and the first received pulse, respectively.

At 960, the ground terminal stores the first range line (RX1 range-compressed).

Figure 10:
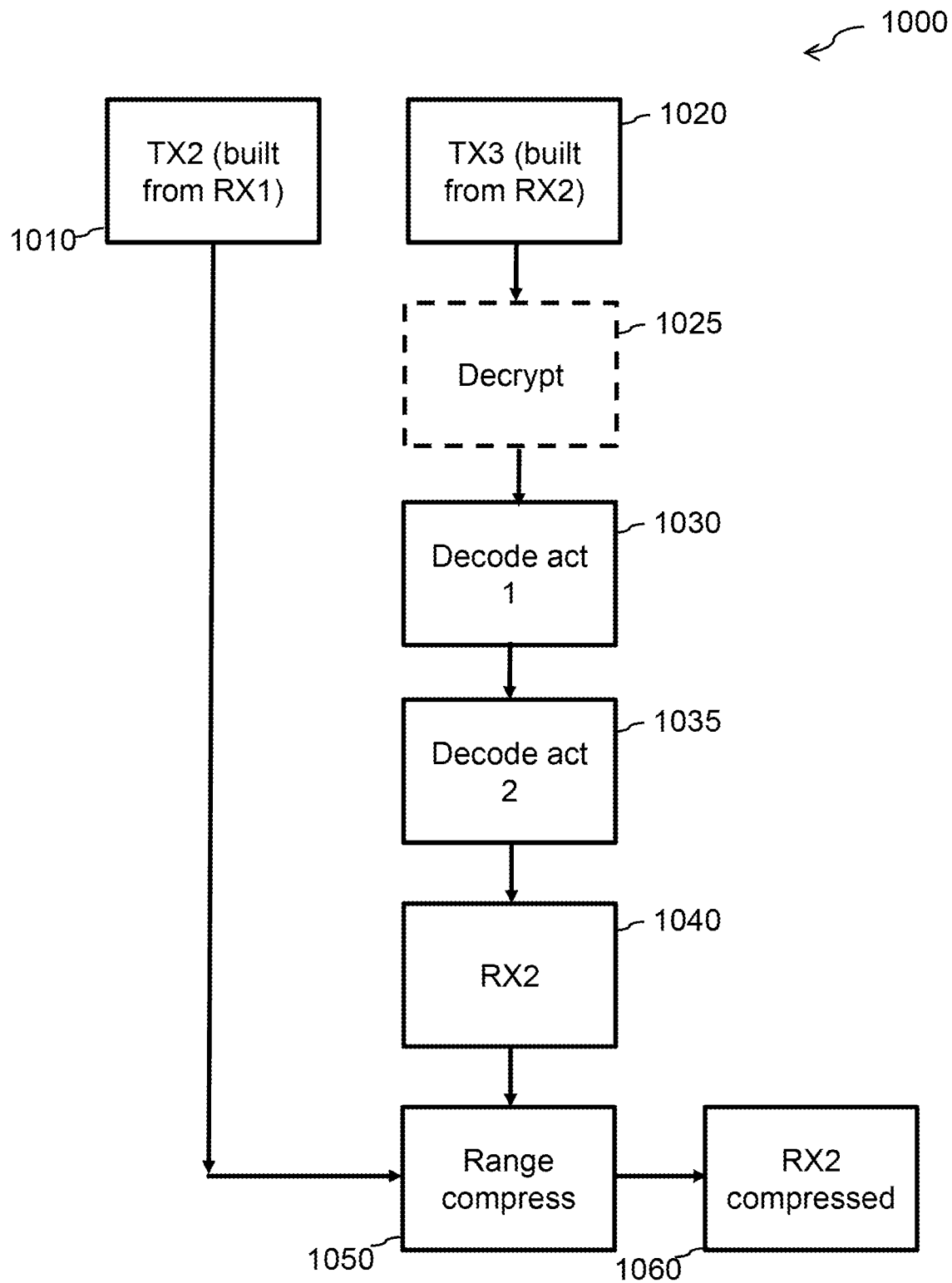
FIG. 10 is a flow chart illustrating another method of range-compressing received pulses by a ground terminal in accordance with the present systems, devices, methods, and articles.

FIG. 10 is a flow chart illustrating another method 1000 of range compressing received pulses by a ground terminal in accordance with the present systems, devices, methods, and articles.

At 1010, the ground terminal retrieves a copy of TX2, the first transmitted pulse. In some implementations, as described above, TX2 is a transmitted pulse built from RX1. At 1020, the ground terminal retrieves a copy of TX3, the third transmitted pulse built from the second received pulse RX2 (see for example FIG. 6).

At 1030 and 1035, the ground terminal decodes TX3 in a first and a second act, respectively. At 1040, the ground terminal regenerates RX2, the second received pulse, and, at 1050, the ground terminal performs range compression using TX2 and RX2, the replica and the second received pulse, respectively.

At 1060, the ground terminal stores the second range line (RX2 range-compressed).

Figure 11:
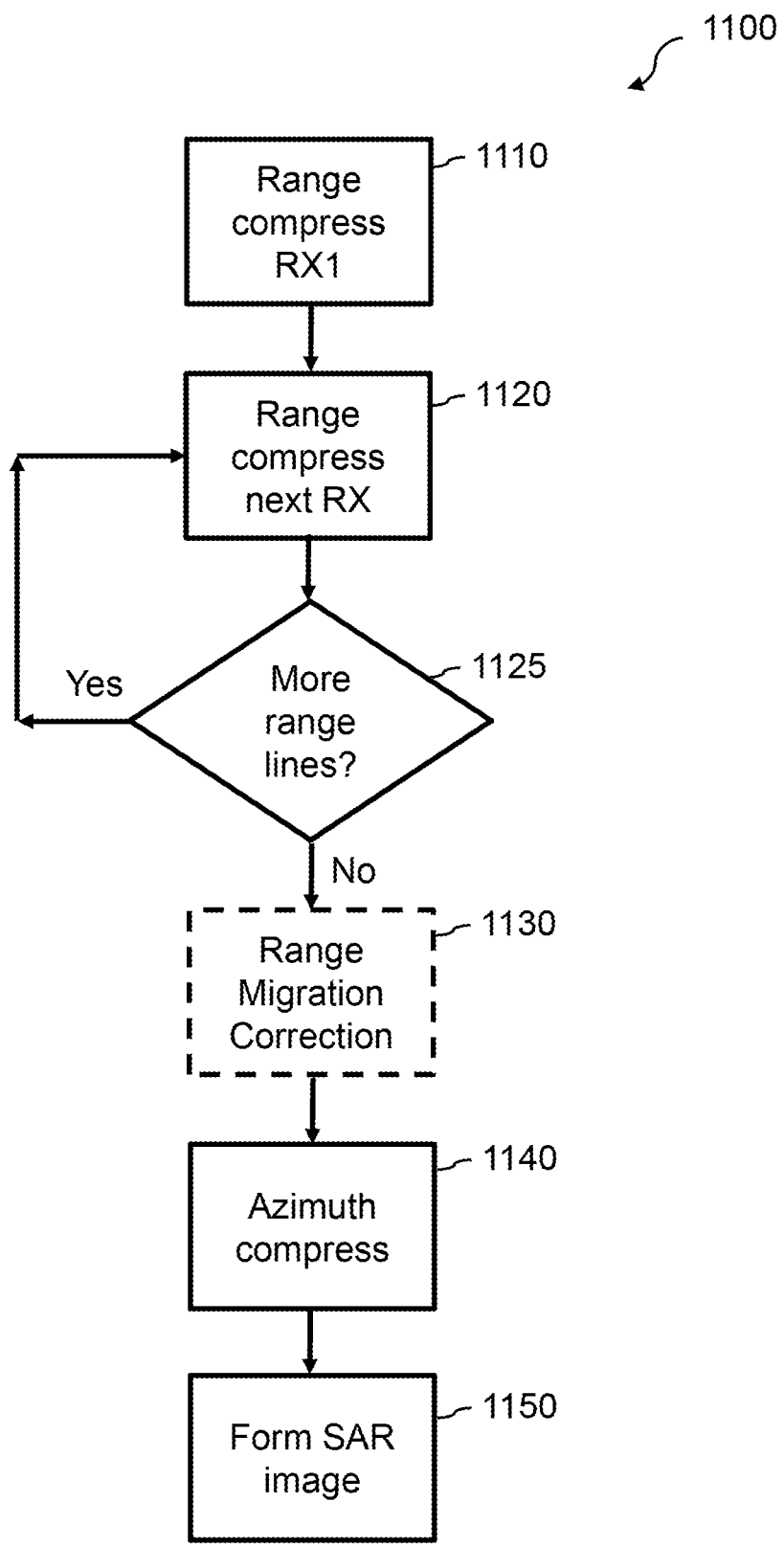
FIG. 11 is a flow chart illustrating an example method of forming a self-image by a ground terminal in accordance with the present systems, devices, methods, and articles.

FIG. 11 is a flow chart illustrating an example method 1100 of forming a self-image by a ground terminal in accordance with the present systems, devices, methods, and articles. The flow chart in FIG. 11 describes acts performed by a data processor such as terminal data processor 280 of FIG. 2.

At 1110, the data processor performs range compression on the first received pulse (RX1). At 1120, the data processor performs range compression on the next received pulse. At 1125, the data processor determines whether there are more range lines to compress. In response to determining there are more range lines to compress, control of method 1100 returns to 1120. In response to determining there are no more range lines to compress, control of method 1100 proceed to 1130. The loop defined by 1120 and 1125 causes method 1100 to range compress all the lines needed to form a desired SAR image from the data.

At 1130, the data processor optionally performs range cell migration correction (as indicated by the dashed box). Range cell migration correction may be required depending on the azimuth beamwidth and the range resolution. At 1140, the data processor performs azimuth compression using the range compressed (and optionally range cell migration corrected) data.

At 1150, the data processor outputs a SAR image for storage, transfer over a network, and/or display on the ground terminal.

Method 1100 is usually referred to as a range-Doppler method for generating SAR images. Other approaches can be used that also include building a transmitted pulse from a backscattered and previously received pulse. Range cell migration correction can be included, as described above, as required by the azimuth beamwidth and the range resolution.

In some radars, such as airborne synthetic aperture radars, an echo of a transmitted pulse (e.g., the transmitted pulse backscattered by a target such as the ground) is received directly after the transmitted pulse, and before the next pulse is transmitted. In other radars, such as spaceborne SARs, an echo of the transmitted pulse is received after one or more subsequent pulses have been transmitted. The intervening pulses are in flight between the radar and the target—on their way to the target or on their way back from the target. The number of intervening pulses can depend on the viewing geometry of the radar.

When there are intervening pulses in flight between a transmitted pulse and its received echo, the systems and methods in the present disclosure describe the transmission of an $n^{th}$ pulse, the encoding of the echo of the $n^{th}$ pulse, and the transmission of the encoded echo of the $n^{th}$ pulse as the $m^{th}$ transmitted pulse, where m>n. If there are no intervening pulses, then m=n+1.

In some implementations, the radar is a pulse radar. In other implementations, the radar is SAR.

Figure 12:
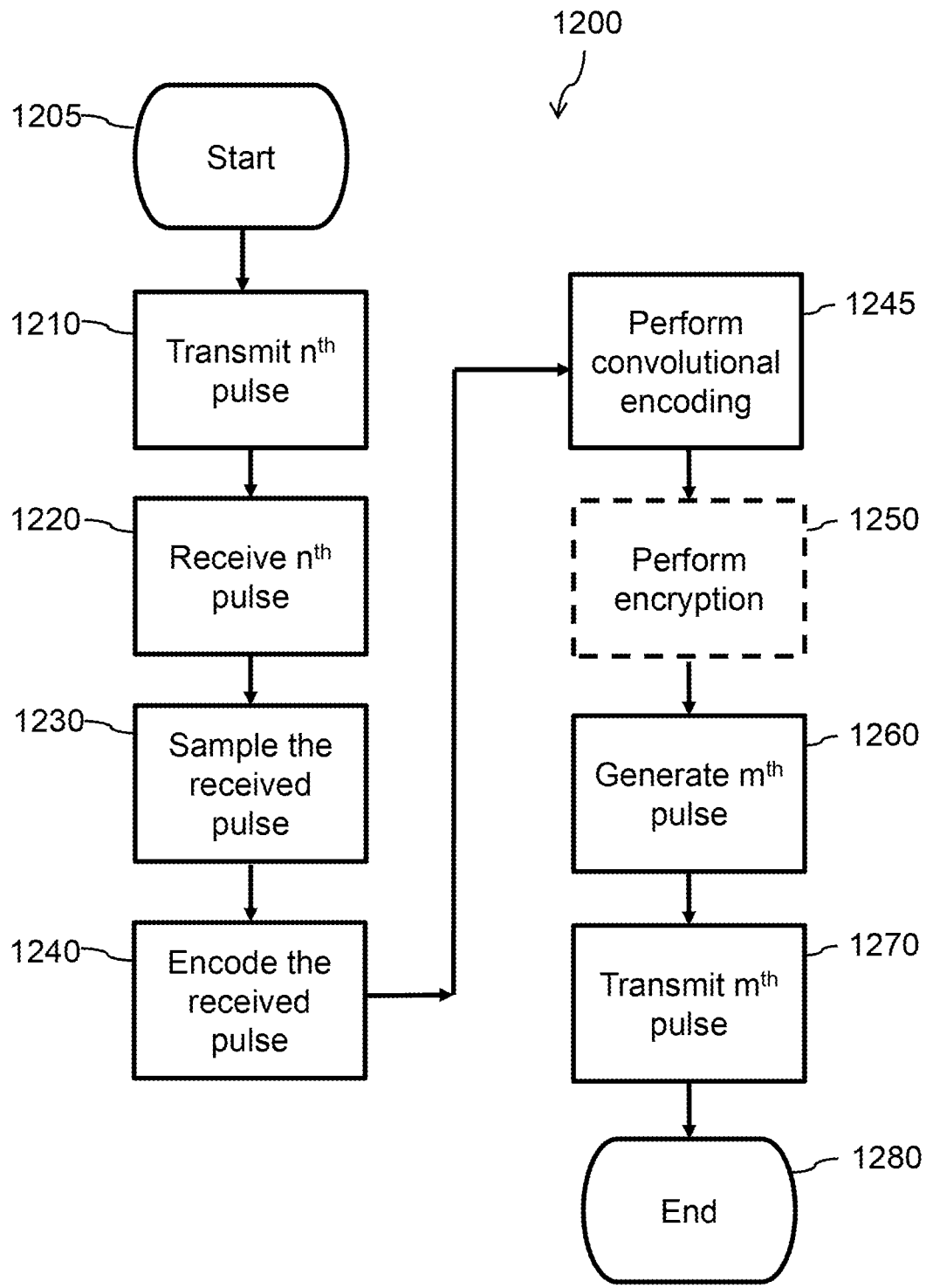
FIG. 12 is a flow chart illustrating another example method of encoding a transmitted pulse of a radar in accordance with the present systems, devices, methods, and articles.

FIG. 12 is a flow chart illustrating an example method 1200 of encoding a transmitted pulse of a radar in accordance with the present systems, devices, methods, and articles. Method 1200 begins at 1205 for example in response to a request from an operator or in response to a command from another system.

At 1210, the radar transmits an $n^{th}$ pulse in a sequence of N pulses. The $n^{th}$ pulse may be a linear FM pulse (such as transmitted pulse 612 of FIG. 6), or another suitable pulse such as an unmodulated pulse or a pulse that includes encoded information. The encoded information can include a received echo from a previously transmitted pulse, for example.

At 1220, the radar receives the $n^{th}$ pulse reflected from a target. The target can be a point target or a distributed target. The radar transmission can be directed at the ground from an airborne or spaceborne vehicle, for example, and the target can be the ground.

At 1230, the radar samples the received pulse, for example to generate in-phase (I) and quadrature (Q) samples. The I and Q samples can be 8-bit samples, for example. In a synthetic aperture radar, the samples can be used to generate an uncompressed range line. The uncompressed range line can be a quasi-stationary Gaussian signal, for example where the pulse has been backscattered from a distributed target.

The sampled pulse can be encoded. Encoding can be performed in a single operation or in multiple operations. In the example illustrated in the FIG. 12, encoding is performed by two operations. In a first encoding operation, at 1240, the radar encodes the data, for example to 8PSK (Phase-Shift Keying using 8 phases). PSK is a digital modulation technique in which a base signal is phase-modulated to represent the data. In a second encoding operation, at 1245, the radar convolutionally encodes the data output from the first encoding operation. At 1250, the radar (optionally) encrypts the encoded data output from the second encoding operation.

Other suitable encoding and/or modulation schemes can be used. For example, 16PSK modulation can be used. The selected encoding scheme can depend, for example, on the size of the power of the radar antenna and the antenna gain-to-noise-temperature (G/T) of a ground terminal antenna used to receive the transmitted pulses. In the case of a synthetic aperture radar, a 16PSK scheme may be more suitable for a high power SAR transmitter and/or a high ground terminal antenna G/T. An 8PSK scheme may be more suitable for a lower power SAR transmitter and/or a lower ground terminal antenna G/T. If the transmitter has amplitude modulation capability, then the transmitted pulse can be encoded, at least in part, using amplitude modulation. Amplitude and phase-shift keying (APSK) can be used as a modulation scheme. In an example scheme, 8PSK is augmented by four additional vectors at half-amplitude at phase angles of 0°, 90°, 180°, and 270°.

The goal of encoding the data is usually to achieve a uniform power spectral density within the radar's operating bandwidth. A uniform power spectral density is typically associated with pseudo-random noise, which is desirable for the encoded data because the autocorrelation function (also known as the range point spread function) will be close to an ideal sin(x)/x curve for pseudo-random noise.

At 1260, the radar generates an $m^{th}$ transmitted pulse based at least in part on the encoded, and optionally encrypted, received $n^{th}$ pulse. At 1270, the radar transmits the $m^{th}$ transmitted pulse.

Method 1200 terminates at 1280, for example until called or invoked again.

Figure 13:
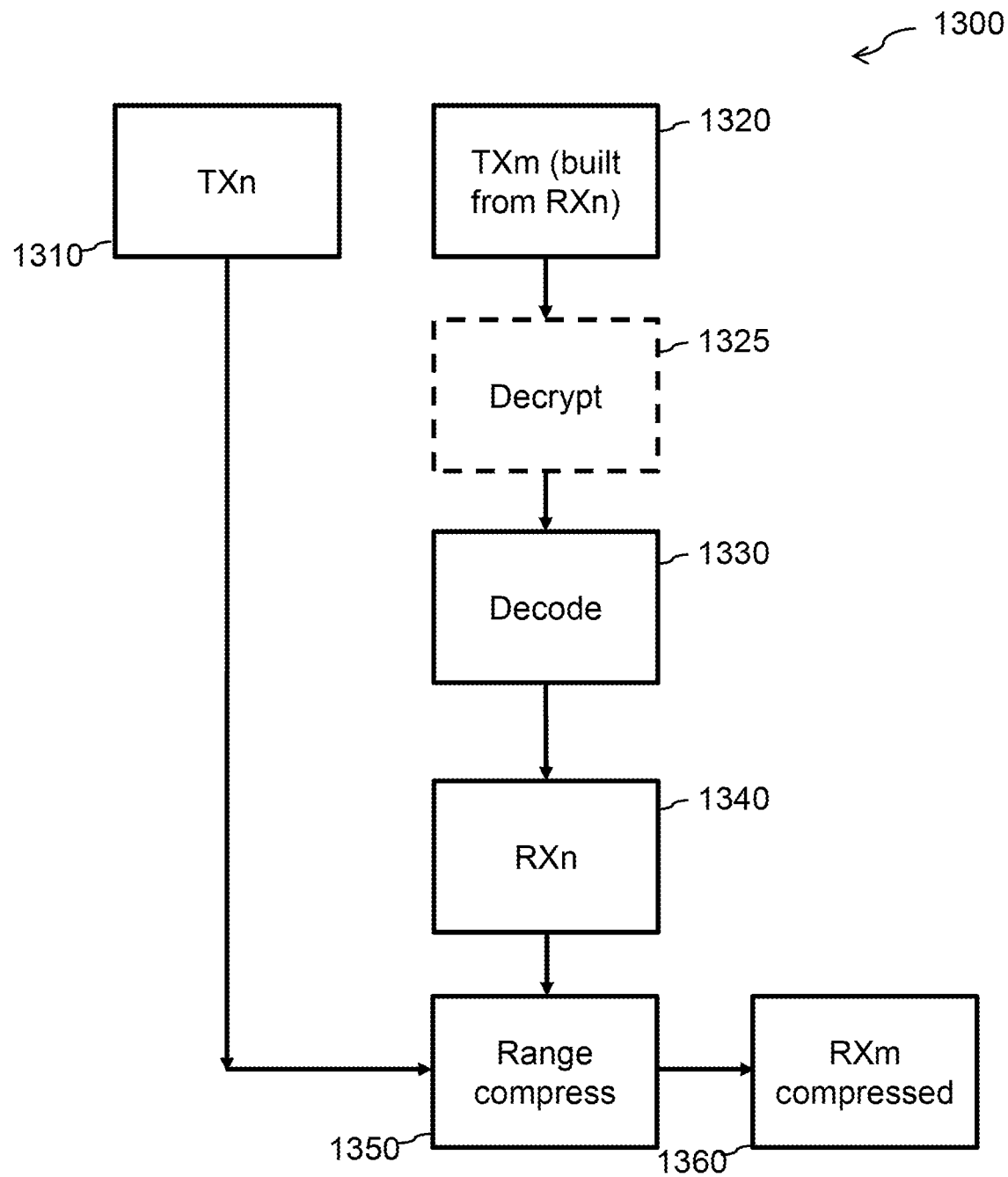
FIG. 13 is a flow chart illustrating another example method of range-compressing received pulses by a ground terminal of a radar in accordance with the present systems, devices, methods, and articles.

FIG. 13 is a flow chart illustrating a method 1300 of range-compressing received pulses by a ground terminal in accordance with the present systems, devices, methods, and articles.

At 1310, the ground terminal retrieves a copy of TXn, the $n^{th}$ transmitted pulse. At 1320, the ground terminal retrieves a copy of TXm, the $m^{th}$ transmitted pulse built from the $n^{th}$ received pulse RXn.

In some implementations, TXm is encrypted, and, at 1325, the ground terminal decrypts TXm. Dashed lines are used in 1325 of FIG. 13 to indicate that decryption is optional. Decoding of TXm can be performed in one or more acts. In the illustrated example of FIG. 13, the ground terminal decodes and/or demodulates TXm in single act 1330. In one example implementation, the first act can include decryption and decoding, and the second act can include demodulation. At 1340, the ground terminal regenerates RXn, the $n^{th}$ received pulse, and, at 1350, the ground terminal performs range compression using TXn and RXn, the replica and the $n^{th}$ received pulse, respectively.

At 1360, the ground terminal stores a compressed range line (RXn range-compressed).

While the foregoing description refers, for the most part, to satellite platforms for SAR and optical sensors, remotely sensed imagery can be acquired using airborne sensors including, but not limited to, aircraft and drones. The technology described in this disclosure can, for example, be applied to imagery acquired from sensors on spaceborne platforms and/or airborne platforms.

The various embodiments described above can be combined to provide further embodiments. U.S. Provisional Patent Application Ser. No. 62/260,063, filed Nov. 25, 2015, and the various patents, applications and publications described above are incorporated herein by reference, in their entirety. Aspects of the embodiments can be modified, if necessary to employ concepts of the various patents, applications and publications to provide yet further embodiments.

The foregoing detailed description has, for instance, set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of operation of a synthetic aperture radar (SAR) comprising a transceiver and a hardware data processor, the method comprising:
   causing by the data processor the SAR to enter an interrogation mode, and while in interrogation mode:
   transmitting by the transceiver one or more interrogation pulses to the ground;
   determining by the data processor if a response to the one or more interrogation pulses has been received from a ground terminal;
   determining by the data processor if position information specifying a ground location has been received from the ground terminal;
   upon determining by the data processor a response to the one or more interrogation pulses has been received from the ground terminal, and position information specifying a ground location has been received from the ground terminal, causing by the data processor the SAR to enter a self-imaging mode, and while in imaging mode:
   transmitting by the transceiver a first transmitted imaging pulse to the ground;
   receiving by the transceiver a first received pulse that includes the first transmitted imaging pulse backscattered from the ground;
   encoding by the data processor the first received pulse to generate a subsequent transmitted imaging pulse; and
   transmitting by the transceiver the subsequent transmitted imaging pulse to the ground.

2. The method of claim 1 wherein encoding by the data processor the first received pulse to generate a subsequent transmitted imaging pulse includes:
   modulating by the data processor the first received pulse by at least one of phase-shift keying (PSK) or amplitude and phase-shift keying (APSK) to generate a modulated first received pulse; and
   convolutionally encoding by the data processor the modulated first received pulse to generate an encoded first received pulse.

3. The method of claim 2 wherein encoding by the data processor the first received pulse to generate a subsequent transmitted imaging pulse further includes encrypting by the data processor the encoded first received pulse to generate an encrypted subsequent transmitted imaging pulse.

4. The method of claim 1 wherein transmitting by the transceiver one or more interrogation pulses to the ground includes transmitting by the transceiver one or more pulses in a broad-beam mode of the SAR.

5. The method of claim 4 wherein transmitting by the transceiver one or more interrogation pulses in a broad-beam mode of the SAR includes transmitting by the transceiver one or more pulses at a pulse repetition frequency in a range of 0.5 Hz to 50 Hz.

6. The method of claim 1 further comprising:
receiving by the transceiver a subsequent received pulse that includes the subsequent transmitted imaging pulse backscattered from the ground;
encoding by the data processor the subsequent received pulse to generate a further subsequent transmitted imaging pulse; and
transmitting by the transceiver the further subsequent transmitted imaging pulse to the ground.

7. The method of claim 6, further comprising:
transmitting by the transceiver a second transmitted imaging pulse to the ground before transmitting by the transceiver the subsequent transmitted imaging pulse to the ground, wherein the transmitting of the subsequent transmitted imaging pulse does not consecutively follow the transmitting of the first transmitted imaging pulse.

8. A method of generating by a ground terminal a synthetic aperture radar (SAR) image of the ground, the ground terminal comprising a transceiver, a data store, and a hardware data processor, the method comprising:
receiving by the transceiver an interrogation pulse transmitted by a SAR;
transmitting by the transceiver a response to the interrogation pulse;
transmitting by the transceiver position information specifying a ground location;
receiving by the transceiver an $n^{th}$ transmitted imaging pulse transmitted by the SAR;
storing the $n^{th}$ transmitted imaging pulse in the data store;
receiving by the transceiver an $n^{th}$ transmitted imaging pulse transmitted by the SAR, wherein m is greater than n, and wherein a radar return received by the SAR includes the $n^{th}$ transmitted imaging pulse backscattered to the SAR from the ground, and the $m^{th}$ transmitted imaging pulse transmitted by the SAR includes an encoding of the radar return received by the SAR;
storing the $m^{th}$ transmitted imaging pulse in the data store;
decoding by the data processor the $m^{th}$ transmitted imaging pulse to regenerate the radar return received by the SAR; and
generating a range line by the data processor for the SAR image of the ground by range compression of the radar return received by the SAR using the $n^{th}$ imaging pulse as a reference function.

9. The method of claim 8 wherein decoding by the data processor the $m^{th}$ transmitted imaging pulse to regenerate the radar return received by the SAR includes:
convolutionally decoding by the data processor the $m^{th}$ transmitted imaging pulse to generate a modulated radar return; and
demodulating by the data processor the modulated radar return to regenerate the radar return received by the SAR.

10. The method of claim 8 wherein the encoding of the $m^{th}$ transmitted imaging pulse includes an encryption of the radar return received by the SAR, and wherein decoding the $m^{th}$ transmitted imaging pulse by the data processor to regenerate the radar return received by the SAR includes:
decrypting by the data processor the $m^{th}$ transmitted imaging pulse to generate an encoded radar return;
convolutionally decoding by the data processor the encoded radar return to generate a modulated radar return; and
demodulating by the data processor the modulated radar return to regenerate the radar return received by the SAR.

11. The method of claim 8 wherein transmitting by the transceiver position information specifying a ground location includes transmitting by the transceiver position information that includes the ground location of the ground terminal.

12. The method of claim 8 wherein transmitting by the transceiver position information specifying a ground location includes transmitting by the transceiver position information that includes the center of a desired image ground area.

13. A synthetic aperture radar (SAR) imaging system, comprising:
a SAR mounted on a SAR platform, the SAR selectively operable in an interrogation mode to transmit a plurality of interrogation pulses to the ground; and
a ground terminal comprising a ground terminal antenna communicatively coupled to a transceiver, the transceiver communicatively coupled to at least one of a ground terminal data store and a ground terminal data processor, wherein the ground terminal is selectively operable to receive an interrogation pulse and respond by transmitting position information specifying a ground location to the SAR, and wherein the SAR imaging system, in response to receiving position information from the ground terminal, generates a SAR image of the ground that includes the ground location specified in the position information received in response to the interrogation pulse.

14. The SAR imaging system of claim 13 wherein the SAR platform is selected from a group consisting of a spaceborne platform and an airborne platform.

15. The SAR imaging system of claim 13 wherein the SAR comprises:
a SAR antenna that in an imaging mode of operation transmits a plurality of transmitted imaging pulses to the ground that includes a first and a subsequent transmitted imaging pulse, and receives a plurality of received returns backscattered from the ground that includes a first and a subsequent received return; and
a SAR transceiver communicatively coupled to the SAR antenna, the SAR transceiver communicatively coupled to at least one of a SAR data store and a SAR data processor, the SAR data store communicatively coupled to the SAR data processor, the SAR data store which stores the first received return, and the SAR data processor which encodes the first received return to generate the subsequent transmitted imaging pulse for transmission by the SAR antenna to the ground.

16. The SAR imaging system of claim 15 wherein the ground terminal transceiver is selectively operable to receive the subsequent transmitted imaging pulse, and the ground terminal data processor decodes the subsequent transmitted imaging pulse to regenerate the first received return, retrieve a reference function from the ground terminal data store, and generates a range line by range compression of the first received return using the reference function.

17. The SAR imaging system of claim 16 wherein the reference function is, at least in part, derived from the first transmitted imaging pulse.

18. The SAR imaging system of claim 15 wherein the SAR data processor comprises:
at least one of a phase-shift keying (PSK) modulator or an amplitude and phase-shift keying (APSK) modulator which in operation generates a modulated first received return from the first received return; and a convolutional encoder which in operation generates an encoded first received return from the modulated first received return.

19. The SAR imaging system of claim 18 wherein the SAR data processor further comprises an encrypter which encrypts the encoded first received return.

20. The SAR imaging system of claim 18 wherein the ground terminal data processor comprises:
- a convolutional decoder which decodes the subsequent transmitted pulse; and
- at least one of a phase-shift keying (PSK) demodulator or an amplitude and phase-shift keying (APSK) demodulator which in operation regenerates the first received return from the decoded subsequent transmitted imaging pulse.

21. The SAR imaging system of claim 13 wherein the SAR is selectively operable in a broad-beam mode, and the plurality of interrogation pulses are transmitted while the SAR is operating in the broad-beam mode.

22. The SAR imaging system of claim 21 wherein the plurality of interrogation pulses are transmitted at a pulse repetition frequency in a range of 0.5 Hz to 50 Hz.

* * * * *